United States Patent
Han et al.

(10) Patent No.: US 10,420,131 B2
(45) Date of Patent: Sep. 17, 2019

(54) UPLINK DATA TRANSMISSION METHOD AND APPARATUS

(71) Applicant: Huawei Technologies Co., Ltd., Shenzhen (CN)

(72) Inventors: Wei Han, Shanghai (CN); Yalin Liu, Shenzhen (CN); Dageng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/852,395

(22) Filed: Dec. 22, 2017

(65) Prior Publication Data

US 2018/0124816 A1  May 3, 2018

Related U.S. Application Data

(63) Continuation of application No. PCT/CN2016/087333, filed on Jun. 27, 2016.

(30) Foreign Application Priority Data

Jun. 25, 2015 (WO) ................ PCT/CN2015/082357

(51) Int. Cl.
*H04W 72/12* (2009.01)
*H04W 48/08* (2009.01)
(Continued)

(52) U.S. Cl.
CPC ......... *H04W 72/1268* (2013.01); *H04L 1/08* (2013.01); *H04L 1/1893* (2013.01); *H04W 48/08* (2013.01);
(Continued)

(58) Field of Classification Search
CPC .......... H04W 72/1268; H04W 48/08; H04W 72/04; H04W 72/0493; H04W 72/1205; H04L 1/08; H04L 1/1893
See application file for complete search history.

(56) References Cited

U.S. PATENT DOCUMENTS

| 2014/0120950 A1 | 5/2014 | Fulton et al. |
| 2014/0192767 A1 | 7/2014 | Au et al. |

(Continued)

FOREIGN PATENT DOCUMENTS

| CN | 101034965 A | 9/2007 |
| CN | 103649770 A | 3/2014 |

(Continued)

OTHER PUBLICATIONS

"Resource Allocation for D2D Communication," 3GPP TSG RAN WG1 Meeting #74bis, Guangzhou, P.R. China, R1-134230, 3rd Generation Partnership Project, Valbonne, France (Oct. 7-11, 2013).

*Primary Examiner* — Ronald B Abelson
(74) *Attorney, Agent, or Firm* — Leydig, Voit & Mayer, Ltd.

(57) ABSTRACT

An uplink data transmission method and apparatus are described. The uplink data transmission method includes receiving a first message including transmission mode information. The transmission mode information indicates that a terminal device is capable of transmitting uplink data by using at least two contention transmission units (CTUs) that are in a same transmission time interval (TTI). The CTU refers to a transmission resource combining: a time, a frequency, and a code domain; a transmission resource combining a time, a frequency, and a pilot; or a transmission resource combining a time, a frequency, a code domain, and a pilot. The uplink data transmitted by using the at least two CTUs is partially the same or totally the same. The method further comprises the terminal device sending a second (Continued)

message including indication information, where the indication information is used to enable the terminal device to determine, according to the indication information, a CTU for uplink data transmission.

20 Claims, 12 Drawing Sheets

(51) Int. Cl.
  *H04W 72/04* (2009.01)
  *H04L 1/08* (2006.01)
  *H04L 1/18* (2006.01)
(52) U.S. Cl.
  CPC ....... *H04W 72/04* (2013.01); *H04W 72/0493* (2013.01); *H04W 72/1205* (2013.01); *H04W 72/0413* (2013.01)

(56) References Cited

U.S. PATENT DOCUMENTS

| | | |
|---|---|---|
| 2014/0254544 A1 | 9/2014 | Kar Kin Au et al. |
| 2016/0205713 A1 | 7/2016 | Seo et al. |
| 2016/0219627 A1 | 7/2016 | Au et al. |
| 2016/0286560 A1 | 9/2016 | Gao et al. |
| 2016/0323911 A1 | 11/2016 | Au et al. |
| 2016/0359593 A1 | 12/2016 | Dai et al. |

FOREIGN PATENT DOCUMENTS

| | | |
|---|---|---|
| CN | 103875187 A | 6/2014 |
| CN | 104104492 A | 10/2014 |
| CN | 104202749 A | 12/2014 |
| CN | 104640211 A | 5/2015 |
| WO | 2014135126 A1 | 9/2014 |
| WO | 2015034310 A1 | 3/2015 |

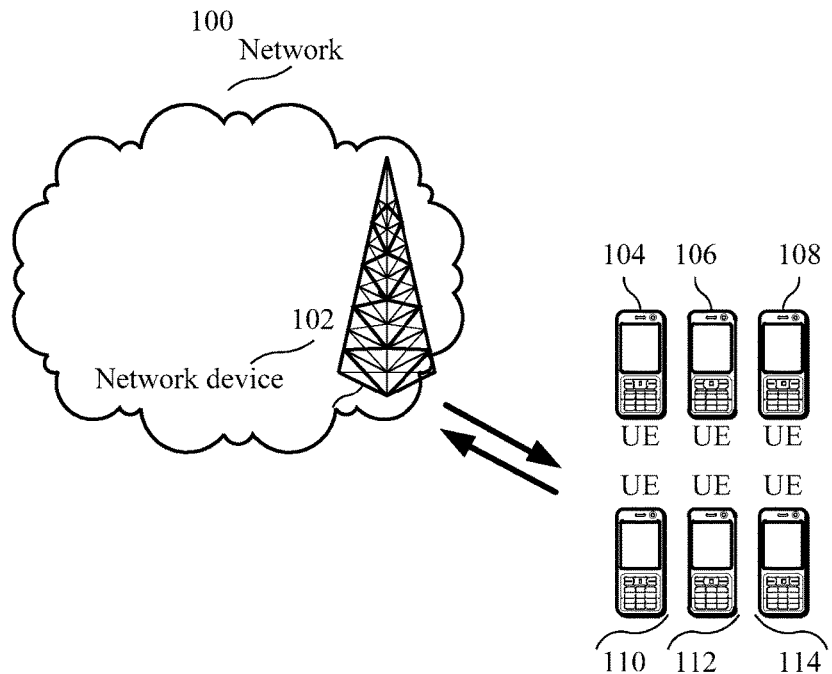

Receive a first message including transmission mode information, where the transmission mode information is used to indicate that a terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same ~ S210

Send a second message including indication information, where the indication information is used to enable the terminal device to determine, according to the indication information, a CTU for uplink data transmission ~ S220

FIG. 2

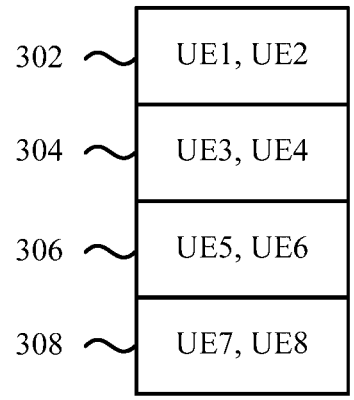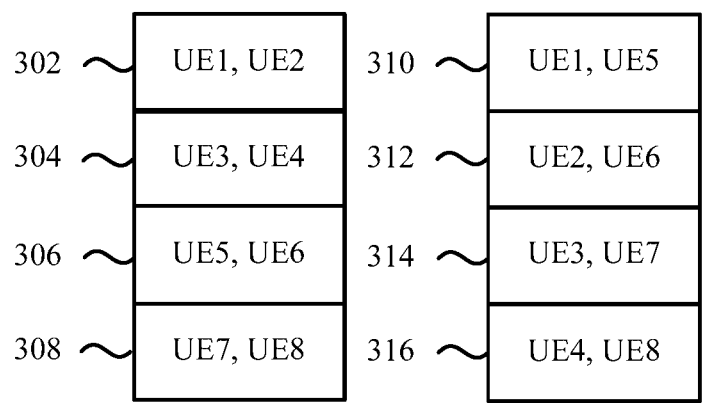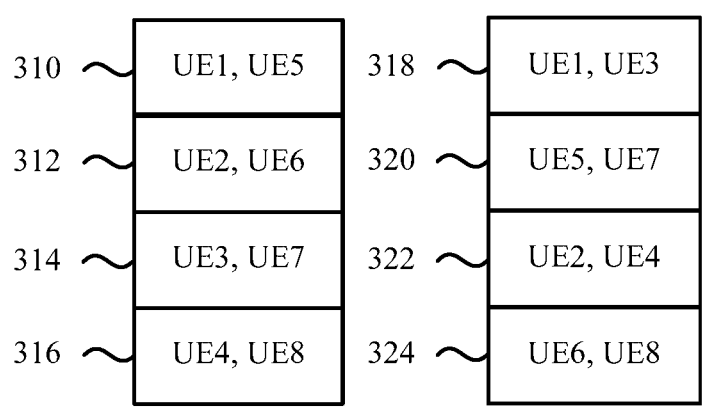
FIG. 3(a)   FIG. 3(b)

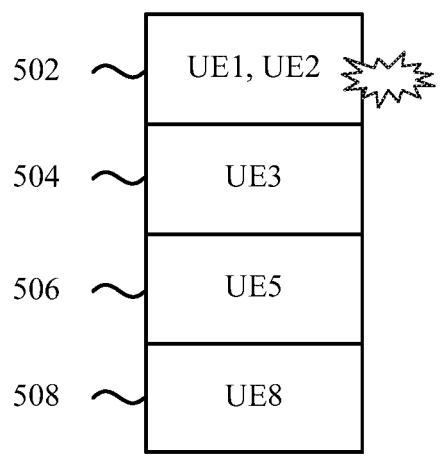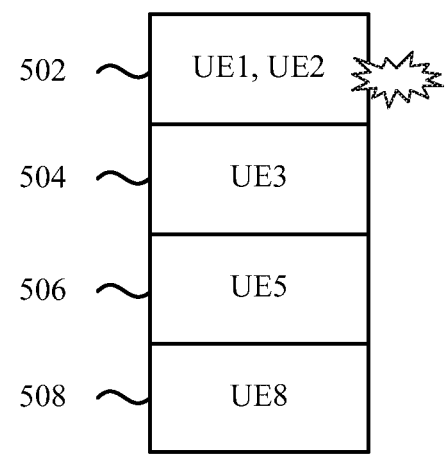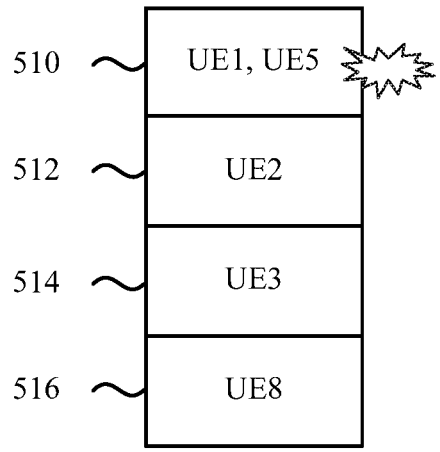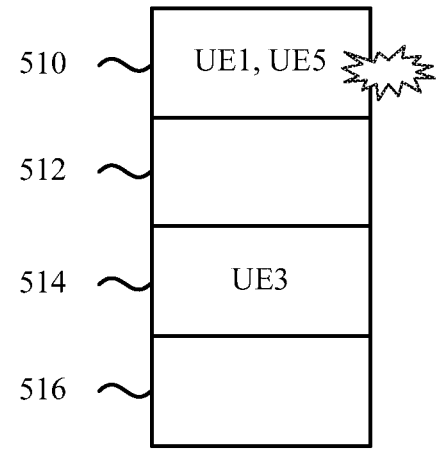
FIG. 5(a)　　　　　　　　FIG. 5(b)

500

Send a first message including transmission mode information, where the transmission mode information is used to indicate that a terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same ～ S510

Receive a second message including indication information, where the indication information is used to enable the terminal device to determine, according to the indication information, a CTU for uplink data transmission ～ S520

FIG. 8

UPLINK DATA TRANSMISSION METHOD AND APPARATUS

CROSS-REFERENCE TO RELATED APPLICATIONS

This application is a continuation of International Patent Application No. PCT/CN2016/087333, filed on Jun. 27, 2016, which claims priority to International Patent Application No. PCT/CN2015/082357, filed on Jun. 25, 2015. The disclosures of the aforementioned applications are hereby incorporated by reference in their entireties.

TECHNICAL FIELD

The present invention relates to the communications field, and more specifically, to an uplink data transmission method and apparatus.

BACKGROUND

In a typical radio communications network (for example, a Long Term Evolution (Long Term Evolution, "LTE" for short) network), an uplink shared data channel (Shared Data Channel) is selected based on a scheduling/grant (Scheduling/Grant) mechanism and a base station (Base Station, "BS" for short) takes full control. In the mechanism, user equipment (User Equipment, "UE" for short) first sends an uplink scheduling request to the BS. When receiving the request, the BS sends an uplink grant to the UE to notify the UE of an uplink transmission resource that is allocated to the UE. Accordingly, the UE transmits data on the granted uplink transmission resource.

Massive user access is one of typical application scenarios of a next-generation communications network. During access of a large quantity of users, if the foregoing scheduling/grant mechanism is still used, on one hand, excessive signaling transmission overheads are caused and a BS is under great pressure to allocate and schedule resources, and on the other hand, a notable transmission latency is caused. In view of this, a grant free (Grant Free) transmission scheme is used in the next-generation communications network to support access of a large quantity of users. In the grant free transmission scheme, the BS defines, in an uplink transmission resource, an access region for a contention transmission unit (Contention Transmission Unit, "CTU" for short). The UE accesses the uplink transmission resource in the region in a contention-based manner without the need of following the scheduling/grant mechanism.

To successfully perform uplink grant free transmission, the UE should first determine a CTU resource for uplink transmission. The CTU resource may be determined based on a pre-determined UE-CTU mapping rule known to both the UE and the BS. The UE may implicitly learn of the mapping rule that is, for example, stipulated by a standard or implemented by a firmware. Alternatively, the BS may explicitly notify the UE of the mapping rule by using higher-layer signaling. For example, different mapping rules may be first defined in a standard, and the BS then informs, by using signaling, the UE of a sequence number of a corresponding mapping rule.

Different UEs are allowed to perform uplink access transmission by using a same characteristic wave (the characteristic wave may be referred to as a signature). The signature may be considered as a code resource. A conflict occurs when multiple UEs use a same signature to synchronously access a same time-frequency resource (that is, a same time-frequency-code resource). A corresponding advanced detection method is required to resolve the conflict. When the multiple UEs that use the same time-frequency-code resource further use a same pilot, it is usually considered that a conflict cannot be resolved by using only the detection method. In this case, a special conflict avoidance or resolution mechanism such as remapping or retransmission needs to be used together. To avoid a conflict between particular UEs or over a particular CTU, some UEs may be remapped to a new CTU resource.

For the foregoing grant free transmission for access of a large quantity of users, because multiple UEs are allowed to perform contention-based transmission on a same CTU resource, a contention conflict is caused, and reliability of the grant free transmission is reduced. To ensure low-latency and high-reliability grant free transmission, it is necessary to provide extra transmission protection to some UEs having a special service requirement.

SUMMARY

Embodiments of the present invention provide an uplink data transmission method and apparatus, so as to improve reliability of data transmission, and reduce a transmission latency.

According to a first aspect, an uplink data transmission method is provided. The method is performed by a network device, and the method includes: receiving a first message including transmission mode information, where the transmission mode information is used to indicate that a terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same; and sending a second message including indication information, where the indication information is used to enable the terminal device to determine, according to the indication information, a CTU for uplink data transmission.

According to a second aspect, an uplink data transmission method is provided. The method is performed by a terminal device, and the method includes: sending a first message including transmission mode information, where the transmission mode information is used to indicate that the terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same; and receiving a second message including indication information, where the indication information is used to enable the terminal device to determine, according to the indication information, a CTU for uplink data transmission.

According to a third aspect, an uplink data transmission apparatus is provided, including: a receiving module, configured to receive a first message including transmission mode information, where the transmission mode information is used to indicate that a terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same; and a sending module, configured to send a second message including indication information, where the indication information is used to enable the terminal device to determine, according to the indication information, a CTU for uplink data transmission.

According to a fourth aspect, an uplink data transmission apparatus is provided, including: a sending module, configured to send a first message including transmission mode information, where the transmission mode information is used to indicate that the apparatus is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same; and a receiving module, configured to receive a second message including indication information, where the indication information is used to enable the apparatus to determine, according to the indication information, a CTU for uplink data transmission.

Based on the foregoing technical features, by means of the uplink data transmission method and apparatus provided in the embodiments of the present invention, a network device receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of an architecture of a communications system to which an embodiment of the present invention is applied;

FIG. 2 is a schematic flowchart of an uplink data transmission method according to an embodiment of the present invention;

FIG. 3(a) to FIG. 3(d) are schematic diagrams of mapping relationships between terminal devices and multiple CTUs in a same TTI according to an embodiment of the present invention;

FIG. 5(a) and FIG. 5(b) are schematic diagrams of mapping relationships between terminal devices and CTUs according to another embodiment of the present invention;

FIG. 8 is a schematic flowchart of an uplink data transmission method according to still another embodiment of the present invention;

DESCRIPTION OF EMBODIMENTS

Figures 3C, 3D:
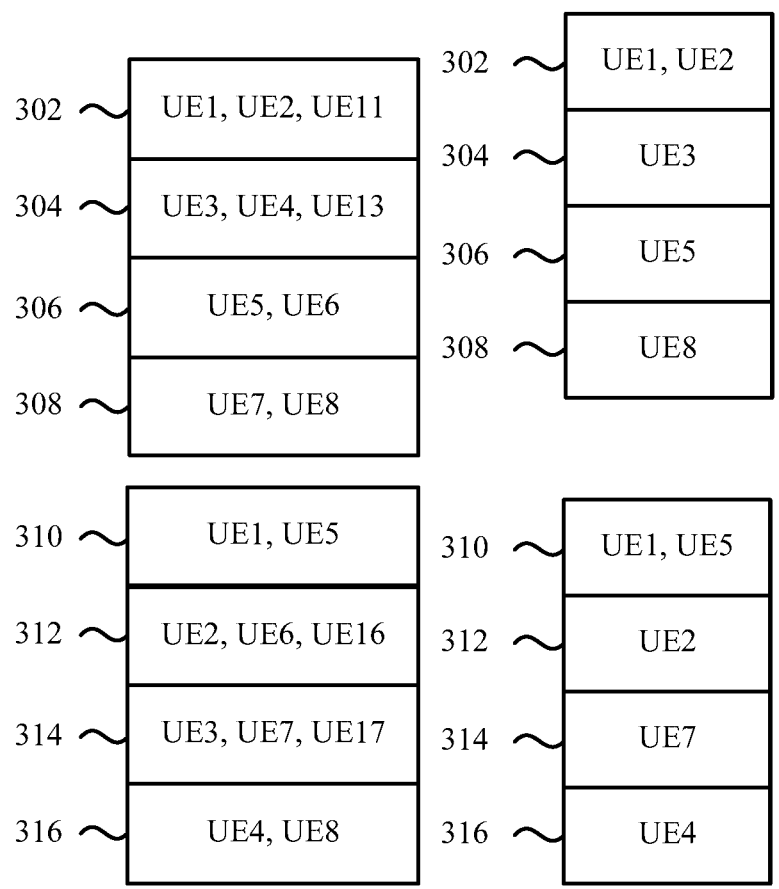

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from a component interacting with another component in a local system, a distributed system, and/or across a network such as the Internet interacting with other systems by using the signal).

The solutions in the embodiments of the present invention may be applicable to an existing cellular communications system, for example, a Global System for Mobile Communications (Global System for Mobile Communications, "GSM" for short) system, a Wideband Code Division Multiple Access (Wideband Code Division Multiple Access, "WCDMA" for short) system, or a Long Term Evolution (Long Term Evolution, "LTE" for short) system. Mainly voice communication and data communication are supported herein. A quantity of connections supported by a conventional base station is usually limited, and implementation is easy.

A next-generation mobile communications system not only supports conventional communication, but also supports machine to machine (Machine to Machine, "M2M for short) communication, which is also referred to as machine type communication (Machine Type Communication, "MTC" for short) communication. According to prediction, a quantity of MTC devices connected to a network is to reach 50 billion to 100 billion in 2020, and this quantity will greatly exceed the existing quantity of connections. For a M2M-type service, various service types have extremely different network requirements. Generally, the following requirements exist:

reliable and latency-insensitive transmission; and
low-latency and high-reliability transmission.

A service of reliable and latency-insensitive transmission is relatively easy to process. However, for a service of low-latency and high-reliability transmission, for example, a device to device (Device to Device, "D2D" for short) service, both transmission reliability and a low transmission latency are required. Unreliable transmission causes retransmission, and further results in an excessively high transmission latency and a failure to satisfy the requirement.

Because of massive connections, a future radio communications system is greatly different from an existing communications system. The massive connections need to consume more resources for access of terminal devices, and need to consume more resources for transmitting scheduling signaling related to data transmission of the terminal devices. The foregoing problem of resource consumption can be effectively resolved according to the solutions in the embodiments of the present invention.

Optionally, a network device is a base station, and the terminal device is user equipment.

The present invention describes the embodiments with reference to the terminal device. The terminal device may also be referred to as user equipment (User Equipment, "UE" for short) user equipment, an access terminal, a user unit, a user station, a mobile station, a remote station, a remote terminal, a mobile device, a user terminal, a terminal, a radio communications device, a user agent, or a user apparatus. The terminal device may be a station (Station, "ST" for short) in a wireless local area network (Wireless Local Area Networks, "WLAN" for short), or may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a radio communications function, a computing device or another processing device connected to a wireless modem, a vehicle-mounted device, a wearable device, or a terminal device in a future 5G network.

In addition, the present invention describes the embodiments with reference to the network device. The network device may be a device configured to communicate with a mobile device. The network device may be an access point (Access Point, "AP" for short) in a WLAN or a base transceiver station (Base Transceiver Station, "BTS" for short) in Code Division Multiple Access (Code Division Multiple Access, "CDMA" for short), or may be a NodeB (NodeB, "NB" for short) in WCDMA, or may be an evolved NodeB (Evolved NodeB, "eNB" or "eNodeB" for short) in Long Term Evolution (Long Term Evolution, "LTE" for short), a relay station, an access point, a vehicle-mounted device, a wearable device, or a network device in a future 5G network.

In addition, aspects or features of the present invention may be implemented as a method, an apparatus, or a product that uses standard programming and/or engineering technologies. The term "product" used in this application covers a computer program that may be accessed from any computer readable component, carrier or medium. For example, a computer readable medium may include, but is not limited to, a magnetic storage device (for example, a hard disk, a floppy disk, or a magnetic tape), an optical disc (for example, a compact disc (Compact Disc, "CD" for short) or a digital versatile disc (Digital Versatile Disc, "DVD" for short)), a smart card, or a flash memory device (for example, an erasable programmable read-only memory (Erasable Programmable Read-Only Memory, "EPROM" for short), a card, a stick, or a key drive). In addition, various storage media described in this specification may indicate one or more information storage devices and/or another machine-readable medium. The term "machine-readable medium" may include, but is not limited to, a radio channel and various other media that can store, contain, and/or carry an instruction and/or data.

FIG. 1 is a schematic diagram of an architecture of a communications system 100 to which an embodiment of the present invention is applied. As shown in FIG. 1, the communications system 100 may include a network device 102 and terminal devices (UE for short in the figure) 104 to 114, and the network device 102 is connected to the terminal devices 104 to 114 in a wireless connection manner, a wired connection manner, or another manner.

The communications system 100 may refer to a public land mobile network (Public Land Mobile Network, "PLMN" for short), a D2D network, an M2M network, or another network. FIG. 1 is only an example of a simplified schematic diagram. The communications system may further include another network device that is not shown in FIG. 1.

To resolve the problem caused by massive MTC-type services in a future network and satisfy the requirement of low-latency and high-reliability service transmission, this patent proposes a solution of grant free transmission. The grant free herein may be specific to uplink data transmission. The grant free transmission may be understood as any one or more of the following meanings, or a combination of some technical features in the multiple meanings, or another similar meaning.

1. The grant free transmission may be as follows: A network device pre-allocates multiple transmission resources and informs a terminal device of the multiple transmission resources. When the terminal device needs to transmit uplink data, the terminal device selects at least one transmission resource from the multiple transmission resources pre-allocated by the network device, and sends the uplink data by using the selected transmission resource. The network device performs detection, on one or more transmission resources of the multiple pre-allocated transmission resources, for the uplink data sent by the terminal device. The detection may be blind detection, or detection performed according to a control field in the uplink data, or detection performed in another manner.

2. The grant free transmission may be as follows: A network device pre-allocates multiple transmission resources and informs a terminal device of the multiple transmission resources. Therefore, when the terminal device needs to transmit uplink data, the terminal device selects at least one transmission resource from the multiple transmission resources pre-allocated by the network device, and sends the uplink data by using the selected transmission resource.

3. The grant free transmission may be as follows: Information about multiple pre-allocated transmission resources is obtained. When uplink data transmission is required, at least one transmission resource is selected from the multiple transmission resources, and uplink data is sent by using the selected transmission resource. An obtaining manner may be obtaining from the network device.

4. The grant free transmission may be an uplink data transmission method for a terminal device without the need of dynamic scheduling by a network device. The dynamic scheduling may be a scheduling manner in which the network device uses signaling to indicate a transmission resource each time the terminal device transmits uplink data. Optionally, the transmission of uplink data of the terminal device may be understood as transmission of uplink data of two or more terminal devices on a same time-frequency resource. Optionally, the transmission resource may be a transmission resource in one or more transmission time units after the UE receives the signaling. One transmission time unit may be a minimum time unit of one transmission, for example, a transmission time interval (Transmission Time Interval, "TTI" for short) whose value may be 1 ms; or may be a preset transmission time unit.

5. The grant free transmission may be as follows: A terminal device transmits uplink data without the need of a grant from a network device. The grant may be as follows: The terminal device sends an uplink scheduling request to the network device. After receiving the scheduling request, the network device sends an uplink grant to the terminal device. The uplink grant indicates an uplink transmission resource allocated to the terminal device.

6. The grant free transmission may be a contention-based transmission scheme, and may specifically mean that multiple terminals synchronously transmit uplink data on a same pre-allocated time-frequency resource without the need of a grant from a base station.

The data may include service data or signaling data.

The blind detection may be understood as detection for possibly incoming data when it is unknown beforehand whether there is incoming data. The blind detection may be understood as detection without an explicit indication by means of signaling. The transmission resource may include, but is not limited to, one or a combination of the following resources:

a time domain resource, for example, a radio frame, a subframe, or a symbol;

a frequency domain resource, for example, a subcarrier or a resource block;

a space domain resource, for example, a transmit antenna, or a beam;

a code domain resource, for example, a sparse code multiple access (Sparse Code Multiple Access, "SCMA" for short) codebook, a low density signature (Low Density Signature, "LDS" for short), or a CDMA code; or an uplink pilot resource.

The foregoing transmission resources may be used for transmission according to a control mechanism that includes, but is not limited to, the following control mechanisms:

uplink power control, for example, control over an upper limit of an uplink transmit power;

setting a modulation and coding scheme, for example, setting a size of a transmission block, a bit rate, or a modulation order; and a retransmission mechanism, for example, an HARQ mechanism.

The foregoing transmission resource may further be divided into one or more contention transmission units (Contention Transmission Unit, "CTU" for short). The CTU may be a basic transmission resource for the grant free transmission. The CTU may refer to a transmission resource combining a time, a frequency, and a code domain, or may refer to a transmission resource combining a time, a frequency, and a pilot, or may refer to a transmission resource combining a time, a frequency, a code domain, and a pilot. A CTU access region may be a time-frequency region used for the grant free transmission.

The patent application NO. PCT/CN2014/073084, entitled "SYSTEM AND METHOD FOR UPLINK GRANT-FREE TRANSMISSION SCHEME" provides a technical solution of uplink grant free transmission. The application NO. PCT/CN2014/073084 describes that a radio resource may be divided into various CTUs, and that UE is mapped to a CTU. A set of codes may be allocated to each CTU, and the allocated set of codes may be a set of CDMA codes, an SCMA codebook set, an LDS group, a signature (signature) group, or the like. Each code may correspond to a group of pilots. A user may select a code and a pilot in a pilot group corresponding to the code to perform uplink transmission. Content of the application NO. PCT/CN2014/073084 may also be understood as a part of content of the embodiments of the present invention by reference. Details are not described herein.

FIG. 2 is a schematic flowchart of an uplink data transmission method according to an embodiment of the present invention. The method is performed by a network device. As shown in FIG. 2, the method 200 includes the following steps.

S210: Receive a first message including transmission mode information, where the transmission mode information is used to indicate that a terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

It may also be understood that the first message indicates that the terminal device is capable of redundant transmission. The redundant transmission includes a transmission mode of transmitting uplink data by using at least two contention transmission units CTUs that are in a same time interval TTI. Understanding of the first message may be applicable to other embodiments, and details are not described again in the other embodiments.

S220: Send a second message including indication information, where the indication information is used to enable the terminal device to determine, according to the indication information, a CTU for uplink data transmission.

Optionally, the CTU for uplink data transmission includes at least two CTUs that are in a same TTI. Further, the at least two CTUs in the same TTI that are included in the CTU for uplink data transmission are used for redundant transmission. In other words, the at least two CTUs in the same TTI that are included in the CTU for uplink data transmission are used to transmit uplink data that is partially same or totally same. The foregoing understanding of the indication information may be applicable to other embodiments, and details are not described again in the other embodiments.

Specifically, a network device receives a first message that is sent by a terminal device and that includes transmission mode information, and determines, according to the transmission mode information, that the terminal device is capable of transmitting uplink data by using at least two contention transmission units CTUs that are in a same time interval TTI. The uplink data transmitted by the terminal device by using the at least two CTUs is partially same or totally same. After receiving the first message, the network device may determine indication information that is used for the terminal device to determine a CTU that can be used for uplink data transmission, and the network device may send a second message including the indication information to the terminal device.

Therefore, by means of the uplink data transmission method in this embodiment of the present invention, a network device receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

It should be understood that in this embodiment of the present invention, the redundant transmission may include the following transmission scheme: Data transmitted during one data transmission includes at least first data and second data, and the second data and the first data are partially same or totally same. Certainly, the redundant transmission may also be referred to as reliable transmission, or a type of reliable transmission. Alternatively, the redundant transmission may be referred to by another name including the foregoing transmission scheme.

Optionally, the method in this embodiment of the present invention is applicable to any one or more of the following fields: a device to device D2D field, a machine to machine M2M field, or a machine type communication MTC field. However, the present invention is not limited thereto.

Optionally, in this embodiment of the present invention, the uplink data transmission is grant free transmission.

In this embodiment of the present invention, optionally, a terminal device that is incapable of redundant transmission may send transmission mode information to the network device, to indicate that the terminal device cannot perform redundant transmission. A terminal device that is capable of redundant transmission does not send transmission mode information to the network device. If the network device does not receive, within a particular time, transmission mode information sent by a terminal device, it may be considered that the terminal is capable of redundant transmission. Alternatively, a terminal device that is capable of redundant transmission sends transmission mode information to the network device, to indicate that the terminal device is capable of redundant transmission. A terminal device that is incapable of redundant transmission does not send transmission mode information to the network device. If the network device does not receive, within a particular time, transmission mode information sent by a terminal device, it is considered that the terminal device is incapable of redundant transmission. However, the present invention is not limited thereto.

It should be understood that when a terminal device is incapable of redundant transmission, the network device still sends a message including the indication information to the terminal device. In this case, the terminal device may determine, according to the indication information, a CTU for conventional transmission, and perform initial transmission or retransmission.

Optionally, in S210, that the uplink data transmitted by using the at least two CTUs is partially same or totally same may be understood as follows: Each of the at least two CTUs transmits a part of uplink data to be transmitted, and different CTUs transmit different data. Alternatively, some CTUs of the at least two CTUs transmit same and complete uplink data to be transmitted, and another CTU of the at least two CTUs transmits a part of the uplink data to be transmitted. This is not limited in the present invention.

Optionally, in S210, the network device may receive, by using an uplink common control channel, the first message sent by the terminal device. The first message may further include a corresponding requirement imposed by the terminal device on redundant transmission. This is not limited in the present invention.

For example, the terminal device may add, to an RRC connection request message (RRC Connection Request Message), a field related to redundant transmission. For example, any indication information that includes, but is not limited to, the following indication information may be added to the RRC connection request message: grantFreeCapability BITSTRING (SIZE(8)), candidateMappingRule, or redundantTransmissionPattern. The grantFreeCapability BITSTRING (SIZE(8)) indicates different grant free (Grant Free) support capabilities. One of the eight bits included in the indication information is used to indicate whether the terminal device is capable of redundant transmission. For example, when the one bit takes a value of 1, it may indicate that the terminal device is capable of redundant transmission (1-Enable), or when the one bit takes a value of 0, it indicates that the terminal device is incapable of redundant transmission (0-Disable). The candidateMappingRule indicates a set of candidate CTU-sequence-number mapping rules. The redundantTransmissionPattern indicates a data transmission mode. The redundantTransmissionPattern may be an example of the foregoing transmission mode information. When there are both information indicating whether the terminal device is capable of redundant transmission and information indicating a data transmission mode, for example, the foregoing bit information, it may be understood that the redundant transmission may include multiple data transmission modes, and transmitting uplink data by using at least two contention transmission units CTUs that are in a same time interval TTI is one of the multiple data transmission modes.

In this embodiment of the present invention, optionally, a grant free time-frequency diversity transmission mode may be added to a transmission mode (Transmission mode) definition in an existing standard, to determine a transmission mode during redundant transmission. For example, definitions may be provided according to a method shown in Table 1:

TABLE 1

| Transmission mode | DCI format | Search space | MIMO manner |
|---|---|---|---|
| X | XA | Common and UE Specific by C-RNTI | Single-antenna port, port x |
|   | X  | UE Specific by C-RNTI | Single-antenna port, port x |

Optionally, in S220, the indication information includes at least one type of the following information: information about a dedicated connection signature DCS of the terminal device; information about a CTU; information about a quantity of CTUs that can be used for the terminal device to transmit the uplink data; information about a CTU access region; information about a quantity of CTUs in a CTU access region; information about a starting CTU in a CTU access region; or information about a CTU-sequence-number mapping rule.

It should be understood that the network device may allocate a unique dedicated connection signature DCS to the terminal device. The network device may directly notify the terminal device of a value of the dedicated connection signature. Alternatively, the network device may notify the terminal device of an index value of the dedicated connection signature, and the terminal device may determine, according to the index value, the DCS allocated by the network device to the terminal device. The information about the CTU may be specifically a CTU sequence number. The information about the CTU access region may be specifically a sequence number of the CTU access region. The information about the CTU-sequence-number mapping rule may be a specific mapping rule, or may be a sequence number corresponding to a specific mapping rule. For example, a set $\{f_{UE\text{-}TR}(\cdot)\}$ of CTU-sequence-number mapping rules may be pre-defined in a stipulation of a standard or in a mutual agreement between two communication parties. The set of CTU-sequence-number mapping rules includes different CTU mapping rules. During communication, the network device notifies, by using signaling, UE of a sequence number of a corresponding mapping rule. Alternatively, during communication, the network device may send a CTU-sequence-number mapping rule to UE by using explicit signaling. This is not limited in the present invention. In this embodiment of the present invention, a form of the sequence number may be an index.

Specifically, in this embodiment of the present invention, the network device may inform the terminal device of only a DCS allocated to the UE. The terminal device may determine, according to a correspondence that is between a DCS and a CTU and that is stipulated in a standard or agreed upon beforehand, a CTU for uplink data transmission. Alternatively, the network device may explicitly inform the UE of a sequence number of a determined CTU access region, and according to the sequence number of the CTU access region, a quantity that is of CTUs in the CTU access region that is stipulated in a standard or agreed upon beforehand, a sequence number of a starting CTU in the CTU access region, and a quantity of CTUs that can be used to transmit the uplink data, the UE determines a CTU for uplink data transmission. Alternatively, the network device may notify the UE of only a quantity of CTUs in a CTU access region, and according to the CTU access region that is stipulated in a standard or agreed upon beforehand, a sequence number of a starting CTU in the CTU access region, a quantity of CTUs that can be used to transmit the uplink data, and the quantity of CTUs in the CTU access region, the UE determines a CTU for uplink data transmission. Alternatively, the network device may explicitly inform the UE of any one or more of the foregoing seven types of information, and the UE determines other types of information according to a stipulation in a standard or a beforehand agreement, and determines, according to the explicitly obtained information and the implicitly determined information, a CTU for uplink data transmission. This is not limited in the present invention.

Optionally, in S220, the network device may send a message including the indication information to all or some terminal devices in the system in a broadcast manner by using a broadcast channel, for example, a broadcast control channel (Broadcast Control Channel, "BCCH" for short) in a Long Term Evolution LTE system. Alternatively, the network device may send a message including the indication information to a particular terminal device or a particular group of terminal devices in a unicast manner by using a dedicated control channel, for example, a dedicated control channel (Dedicated Control Channel, "DCCH" for short) in a Long Term Evolution LTE system. Alternatively, the network device may deliver a message including the indication information to all terminal devices, some terminal devices, a particular terminal device, or a particular group of terminal devices in the system in another manner by using another channel. This is not limited in the present invention.

In this embodiment of the present invention, optionally, in addition to the indication information, the second message may further include enabling information about whether the network device supports grant free transmission and grant free redundant transmission. The enabling information of the grant free redundant transmission includes information such as whether the network device supports the grant free redundant transmission, or a modulation and coding scheme (Modulation and Coding Scheme, "MCS" for short) supporting the grant free redundant transmission, and may further include other information. This is not limited in the present invention.

For example, the network device may add, to a radio resource control message (RRC Message), indication information related to redundant transmission. For example, "grantFreeCapability BITSTRING (SIZE(8))" may be added to "SystemInformationBlockTypeX" in an existing standard, to define different grant free support capabilities. One of the eight bits is used to indicate whether the network device is capable of supporting redundant transmission. For example, when the one bit takes a value of 1, it may indicate that the network device is capable of supporting redundant transmission (1-Enable), or when the one bit takes a value of 0, it indicates that the network device is incapable of supporting redundant transmission (0-Disable). The network device may add, to an RRC connection request message, any one or more types of information that include, but are not limited to, the following indication information: ueDCSIndex, indicating a sequence number of a dedicated DCS of UE; ctuAccessRegion, indicating a CTU access region; ctuNumber, indicating a quantity of CTUs in a CTU access region; or ctuMappingRule, indicating a UE-CTU-sequence-number mapping rule.

In this embodiment of the present invention, optionally, the information about the CTU-sequence-number mapping rule is a rule for determining a CTU sequence number according to any one or more of the following parameters: the information about the DCS of the terminal device; the quantity of CTUs that can be used for the terminal device to transmit the uplink data; the quantity of CTUs in the CTU access region; or a sequence number of the starting CTU in the CTU access region.

In this embodiment of the present invention, optionally, the rule for determining the CTU sequence number is any one or more of the following formulas:

$I_{TR\text{-}ij}=(I_{TR\text{-}INT}+DCS_i+j) \bmod N_{TR}$, or $I_{TR\text{-}ij}=f(I_{TR\text{-}INT}+DCS_i+j) \bmod N_{TR}$, where j=0, 1, . . . , $\Delta_i$−1, $DCS_1$=0, $DCS_i$=$DCS_{i\text{-}1}$+$\Delta_{i\text{-}1}$, i=2, 3, . . . , f(·) is an interleaving function, an interleaving range is [0, . . . , $N_{TR}$−1], $I_{TR\text{-}ij}$ is a CTU sequence number, $I_{TR\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{TR}$ is the quantity of CTUs in the CTU access region.

In this embodiment of the present invention, optionally, a terminal device that is capable of redundant transmission and a terminal device that is incapable of redundant transmission may have a same CTU access region, so that utilization of a transmission resource can be improved.

In this embodiment of the present invention, optionally, a dedicated region for the redundant transmission may be defined. It may be understood that the dedicated region allows contention-based access of only a terminal device that is capable of redundant transmission, so as to transmit uplink data. The redundant transmission may be understood according to the foregoing description. That is, the CTU access region may also be referred to as a CTU access region used for redundant transmission, or the CTU access region is a CTU access region used for reliable transmission, or the CTU access region is a CTU access region used for reliable ultra-low latency (Reliable Ultra-Low Latency, "RULL" for short) transmission, or an access region with another name. However, the present invention is not limited thereto.

Correspondingly, the information about the CTU-sequence-number mapping rule is a rule for determining a CTU sequence number according to any one or more of the following parameters: the information about the DCS of the terminal device; a quantity of CTUs that can be used for the terminal device to redundantly transmit the uplink data; a quantity of CTUs in the CTU access region used for redundant transmission; or a sequence number of a starting CTU in the CTU access region used for redundant transmission.

Optionally, the rule for determining the CTU sequence number is any one or more of the following formulas:

$I_{TR\text{-}ij}=(I_{TR\text{-}INT}+DCS_i+j) \bmod N_{TR}$, or $I_{TR\text{-}ij}=f(I_{TR\text{-}INT}+DCS_i+j) \bmod N_{TR}$, where j=0, 1, . . . , $\Delta_i$−1, $DCS_1$=0, $DCS_i$=$DCS_{i\text{-}1}$+$\Delta_{i\text{-}1}$, i=2, 3, . . . , f(·) is an interleaving function, an interleaving range is [0, . . . , $N_{TR}$−1], $I_{TR\text{-}ij}$ is a CTU sequence number, $I_{TR\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{TR}$ is the quantity of CTUs in the CTU access region used for redundant transmission.

In this embodiment of the present invention, optionally, the CTU access region includes one or multiple CTU access regions, and the multiple CTU access regions are CTU access regions belonging to a same TTI. That is, the terminal device may be mapped to multiple CTUs in a same TTI to transmit the uplink data.

For example, FIG. 3(a) to FIG. 3(d) are diagrams of mapping relationships between terminal devices and CTUs that are in a same TTI according to an embodiment of the present invention. In FIG. 3(a), eight terminal devices whose sequence numbers are sequentially UE1 to UE8 are mapped to eight CTUs in total, and in each CTU, two different terminals transmit uplink data. The eight terminal devices are mapped to a first group of four CTUs 302 to 308 in a combination manner that is defined in a first CTU-sequence-number mapping rule. The UE1 and the UE2 are mapped to the CTU302, the UE3 and the UE4 are mapped to the CTU304, the UE5 and the UE6 are mapped to the CTU306, and the UE7 and the UE8 are mapped to the CTU308. In addition, the eight terminal devices are further mapped to a second group of four CTUs 310 to 316 in a combination manner that is defined in a second CTU-sequence-number mapping rule. The UE1 and the UE5 are mapped to the CTU310, the UE2 and the UE6 are mapped to the CTU312, the UE3 and the UE7 are mapped to the CTU314, and the UE4 and the UE8 are mapped to the CTU316.

If there are sufficient time-frequency resources and the terminal device needs to further increase flexibility of redundant transmission, all or some of the foregoing terminal devices may be further mapped to another CTU in the same TTI in a combination manner that is defined in a similar CTU-sequence-number mapping rule. For example, in FIG. 3(b), the eight terminal devices are further mapped to a third group of four CTUs 318 to 324 in a combination manner that is defined in a third CTU-sequence-number mapping rule. The UE1 and the UE3 are mapped to the CTU318, the UE5 and the UE7 are mapped to the CTU320, the UE2 and the UE4 are mapped to the CTU322, and the UE6 and the UE8 are mapped to the CTU324. Similarly, the foregoing terminal devices may be mapped to another group of CTUs in a combination manner that is defined in another CTU-sequence-number mapping rule.

In consideration of redundant transmission of multiple groups of terminal devices, the multiple groups of terminal devices may be totally or partially mapped to all or some of the foregoing CTU resources. For example, in FIG. 3(c), some terminal devices, that is, the UE11 and the UE13, in a second group of terminal devices are respectively mapped to the CTU302 and the CTU304; and some terminal devices, that is, the UE16 and the UE17, in a third group of terminal devices are mapped to the CTU312 and the CTU314 respectively.

In this embodiment of the present invention, a terminal device that performs redundant transmission and a terminal device that performs conventional transmission may be mapped to CTUs that are in a same TTI. For example, as shown in FIG. 3(d), in a same TTI, the UE1, the UE2, and the UE5 perform grant free redundant transmission. The UE1 is mapped to the CTU302 and the CTU310, the UE2 is mapped to the CTU302 and the CTU312, and the UE5 is mapped to the CTU306 and the CTU310. The UE3, the UE4, the UE7, and the UE8 perform grant free conventional transmission. The UE3 is mapped to the CTU304, the UE4 is mapped to the CTU316, the UE7 is mapped to the CTU314, and the UE8 is mapped to the CTU308. Similarly, the foregoing terminal devices may also be mapped to different CTUs in a combination manner that is defined in another CTU-sequence-number mapping rule. This is not limited in the present invention.

In this embodiment of the present invention, optionally, the multiple CTU access regions further include CTU access regions belonging to different TTIs. That is, the terminal device may be mapped to CTUs that are in different TTIs to transmit uplink data.

Figure 4:
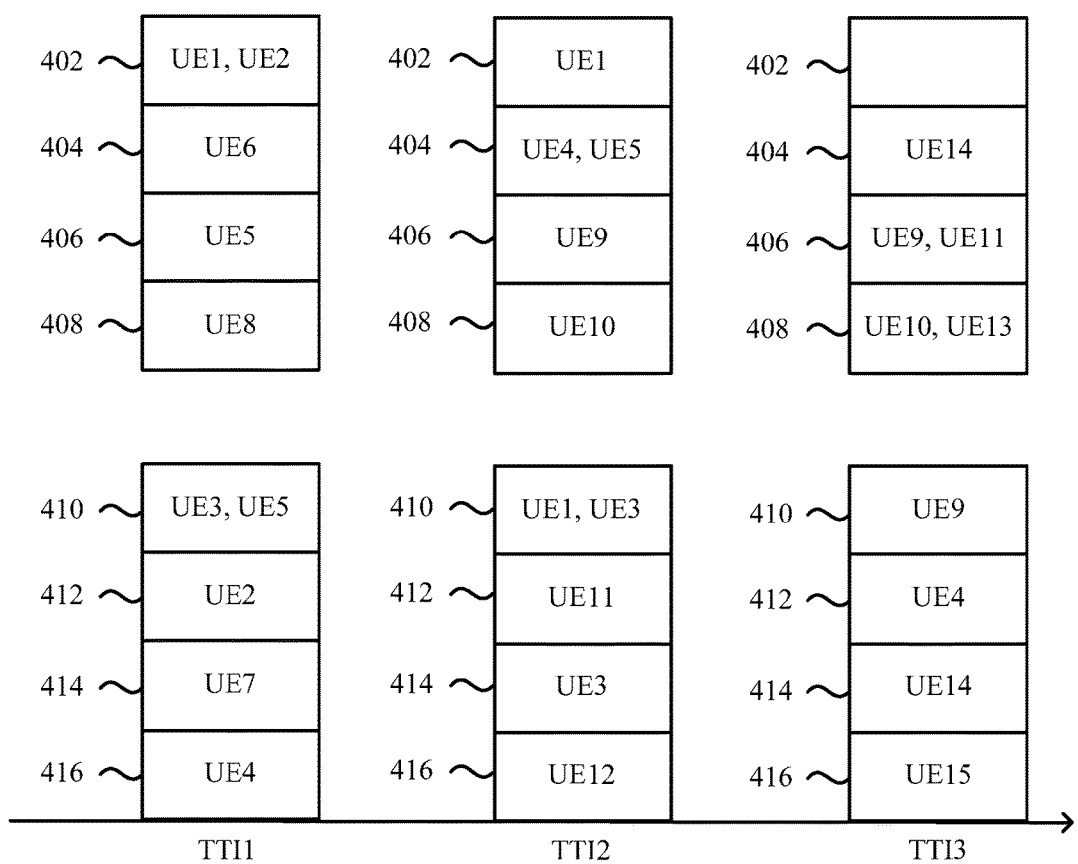
FIG. 4 is a schematic diagram of a mapping relationship between terminal devices and multiple CTUs in multiple TTIs according to an embodiment of the present invention.

For example, FIG. 4 shows mapping relationships between terminal devices and CTUs in multiple TTIs according to this embodiment of the present invention. As shown in FIG. 4, UE6, UE7, and UE8 perform grant free conventional transmission in a TTI1. The UE6 is mapped to a CTU404, the UE7 is mapped to a CTU414, and the UE8 is mapped to a CTU408. UE12 performs grant free conventional transmission in a TTI2, and is mapped to a CTU416. UE13 and UE15 perform grant free conventional transmission in a TTI3. The UE13 is mapped to the CTU408, and the UE15 is mapped to the CTU416.

Other UEs separately perform grant free redundant transmission in multiple TTIs. UE1 is mapped to a CTU402 in the TTI1 and a CTU402 and a CTU410 in the TTI2. UE2 is mapped to the CTU402 and a CTU412 in the TTI1. UE3 is mapped to the CTU410 in the TTI1 and the CTU410 and a CTU414 in the TTI2. UE4 is mapped to the CTU416 in the TTI1, a CTU404 in the TTI2, and a CTU412 in the TTI3. UE5 is mapped to a CTU406 and the CTU410 in the TTI1 and the CTU404 in the TTI2. UE9 is mapped to a CTU406 in the TTI2 and a CTU406 and a CTU410 in the TTI3. UE10 is mapped to a CTU408 in the TTI2 and a CTU408 in the TTI3. UE11 is mapped to a CTU412 in the TTI2 and the CTU406 in the TTI3. UE14 is mapped to a CTU404 and a CTU414 in the TTI3. However, the present invention is not limited thereto.

In this embodiment of the present invention, optionally, the uplink data transmitted by using the at least two CTUs is data to be retransmitted. That is, the terminal device may determine, according to the indication information, a CTU for initial transmission and a CTU for retransmission. When determining that the initial transmission fails, the terminal device determines, according to the indication information, the CTU for retransmission to transmit the data to be retransmitted.

In this embodiment of the present invention, optionally, when the network device does not successfully receive a part of the uplink data, the terminal device may choose to retransmit the part of data that is not successfully received, or may choose to retransmit all the data. When the network device does not successfully receive all the uplink data, the terminal device retransmits all the uplink data. A data transmission mode to be used during retransmission is not limited in the present invention.

In this embodiment of the present invention, optionally, when the terminal device fails to transmit the uplink data, the terminal device may further determine, according to a new CTU-sequence-number mapping rule, a CTU for retransmission. The new CTU-sequence-number mapping rule may be stipulated in a standard or agreed upon by the UE and the network device beforehand, or may be sent by the network device to the UE by using a broadcast channel or another downlink channel. For example, when the terminal device fails to transmit the uplink data, the terminal device may receive a message that is sent by the network device and that includes a CTU remapping rule. The terminal device determines, according to the CTU remapping rule, a CTU for retransmission. This is not limited in the present invention.

For example, the new CTU-sequence-number mapping rule may be a new mapping rule reselected from a set $\{f_{UE-TR}(\cdot)\}$ of selectable mapping solutions. Alternatively, a $DCS_i$ may be re-allocated to $UE_i$, and a value of $I_{TR,ij}=[I_{TR,i0}, I_{TR,i1}, \ldots I_{TR,i(\Delta_{i-1})}]$ is updated according to a currently used rule for determining a CTU sequence number, so as to map $UE_i$ to a new CTU, and provide a new CTU transmission resource to $UE_i$. Alternatively, values of one or more elements in $I_{TR,ij}=[I_{TR,i0}, I_{TR,i1}, \ldots I_{TR,i(\Delta_{i-1})}]$ may be changed, so as to provide a partially new CTU transmission resource to $UE_i$. However, the present invention is not limited thereto.

In this embodiment of the present invention, optionally, if the UE and the network device (for example, a base station BS) agree upon an ACK manner to acknowledge that reception detection succeeds, the network device sends an ACK to the UE after detection succeeds. If the UE does not receive an ACK within a particular time, it is considered that a conflict occurs in uplink transmission, and the network device fails to receive the uplink data. If the UE and the network device agree upon a NACK manner to acknowledge that reception detection fails, the network device sends a NACK to the UE after detection fails. If the UE receives a NACK, it is considered that a conflict occurs in uplink transmission, and the network device fails to receive the uplink data.

It should be understood that in this embodiment of the present invention, the network device receives uplink grant free transmission from multiple terminal devices. The network device recognizes, according to a correspondence between $I_{CTU}$ and a CTU access region and a correspondence between $I_{CTU}$ and a DCS of the terminal device, CTUs for grant free redundant transmission, and performs redundant reception on these CTUs.

During redundant reception, an ACK/NACK feedback of the reception detection for $UE_i$ is not performed separately for each CTU indicated by $I_{CTU,ij}$. Instead, after $UE_i$ completes redundant combination and reception, only one ACK/NACK is sent.

In this embodiment of the present invention, optionally, when redundant reception is performed for $UE_i$, the network device may separately perform channel estimation and signal detection and decoding on a corresponding CTU according to an indication of $I_{TR,ij}=[I_{TR,i0}, I_{TR,i1}, \ldots I_{TR,i(\Delta_{i-1})}]$, combine signal bits that are on a CTU and that are obtained after successful decoding, and obtain a bit-level combination and reception gain, so as to improve transmission reliability of $UE_i$. Alternatively, the network device may further separately perform channel estimation on a corresponding CTU according to an indication of $I_{TR,ij}=[I_{TR,i0}, I_{TR,i1}, \ldots I_{TR,i(\Delta_{i-1})}]$, perform joint detection by using a channel estimation result of each CTU and each received signal, and obtain a combination and reception gain to output bit information, so as to improve transmission reliability of $UE_i$. However, the present invention is not limited thereto.

For example, as shown in FIG. 5(a), UE1 and UE2 are mapped to a CTU502, and the UE1 and UE5 are mapped to a CTU510. Therefore, a conflict in uplink transmission occurs on both the CTU502 and the CTU510. To resolve a conflict in grant free transmission, a signal model on a corresponding CTU may be described by the following system (1) of linear equations:

$$\begin{cases} y_1 = h_{11}x_1 + h_{12}x_2 + n_1 \\ y_2 = h_{25}x_5 + n_5 \\ y_3 = h_{31}x_1 + h_{35}x_5 + n_3 \\ y_4 = h_{42}x_2 + n_4 \end{cases} \quad (1)$$

where $y_1$ is a received-signal model on the CTU502, $y_2$ is a received-signal model on a CTU506, $y_3$ is a received-signal model on the CTU510, $y_4$ is a received-signal model on a CTU512, $X_j$ indicates a signal sent by $UE_j$, $H_{ij}$ indicates information about a channel from $UE_j$ to $y_i$, and $n_i$ indicates noise received by $y_i$.

By solving two independent equations (2) in the system (1) of linear equations:

$$\begin{cases} y_2 = h_{25}x_5 + n_3 \\ y_4 = h_{42}x_2 + n_4 \end{cases}, \quad (2)$$

estimates $\hat{X}_5$ and $\hat{X}_2$ of $X_5$ and $X_2$ are obtained, and $X_5$ and $X_2$ are removed from the two remaining equations according to the estimates, so that the two remaining equations are converted into a solution-finding equation (3):

$$\begin{cases} y_1 = h_{11}x_1 + n_1 \\ y_3 = h_{31}x_1 + n_3 \end{cases}. \quad (3)$$

That is, to resolve the conflict in grant free transmission, information about the UE5 and the UE2 may be respectively obtained by means of solving from the CTU506 and the CTU512 on which no conflict occurs, and interference of the UE2 and the UE5 to the UE1 is then respectively eliminated from the CTU502 and the CTU510 by using the obtained information, so as to eventually work out the UE1.

Optionally, in FIG. 5(b), the UE1 and the UE2 are mapped to the CTU502, and the UE1 and the UE5 are mapped to the CTU510. Therefore, a conflict exists on both the CTU502 and the CTU510. To resolve a conflict in grant free transmission, a signal model on a corresponding CTU may be described by a system (4) of linear equations:

$$\begin{cases} y_1 = h_{11}x_1 + h_{12}x_2 + n_1 \\ y_2 = h_{25}x_5 + n_3 \\ y_3 = h_{31}x_1 + h_{35}x_5 + n_3 \end{cases}, \quad (4)$$

where $y_1$ is a received-signal model on the CTU502, $y_2$ is a received-signal model on the CTU506, $y_3$ is a received-signal model on the CTU510, $X_j$ indicates a signal sent by $UE_j$, $H_{ij}$ indicates information about a channel from $UE_j$ to $y_i$, and $n_i$ indicates noise received by $y_i$.

An estimate $\hat{X}_5$ of $X_5$ may be first obtained by solving an independent equation $y_2=h_{25}x_5+n_2$. $X_5$ is then removed from $y_3$ according to the estimate, and an estimate $\hat{X}_1$ of $X_1$ is obtained by solving $y_3=h_{31}x_1+n_3$. Finally, $X_1$ is removed from $y_1$ according to the estimate, and an estimate $\hat{X}_2$ of $X_2$ is obtained by solving $y_1=h_{12}x_2+n_1$.

That is, to resolve the conflict in grant free transmission, information about the UE5 may be obtained by means of solving from the CTU506 on which no conflict occurs, interference of the UE5 to the UE1 is eliminated from the CTU510 by using the obtained information about the UE5, so as to obtain information about the UE1 by means of solving. Finally, interference of the UE1 to the UE2 is eliminated from the CTU502 by using the obtained information about the UE1, and the UE2 is eventually worked out.

In this embodiment of the present invention, as shown in FIGS. 5(a) and 5(b), UE3 is respectively mapped to a CTU504 and a CTU514, and there is no conflict with another terminal device. A received-signal model on the CTU504 and the CTU514 may be represented by a formula (5):

$$\begin{cases} y_5 = h_{53}x_3 + n_5 \\ y_6 = h_{63}x_3 + n_6 \end{cases}, \quad (5)$$

where $y_5$ is the received-signal model on the CTU504, $y_6$ is the received-signal model on the CTU514, $H_{ij}$ indicates information about a channel from $UE_j$ to $y_i$, and $n_i$ indicates noise received by $y_i$.

On the other hand, a receiving model for $UE_1$ after a conflict is resolved is a formula (3):

$$\begin{cases} y_1 = h_{11}x_1 + n_1 \\ y_3 = h_{31}x_1 + n_3 \end{cases}. \quad (3)$$

In view of this, the grant free redundant transmission provides extra flexibility to corresponding UE, so as to improve transmission reliability.

The following describes the embodiments of the present invention with reference to specific examples. It should be noted that these examples are only intended to help a person skilled in the art better understand the embodiments of the present invention, not to limit the scope of the embodiments of the present invention.

Figure 6:
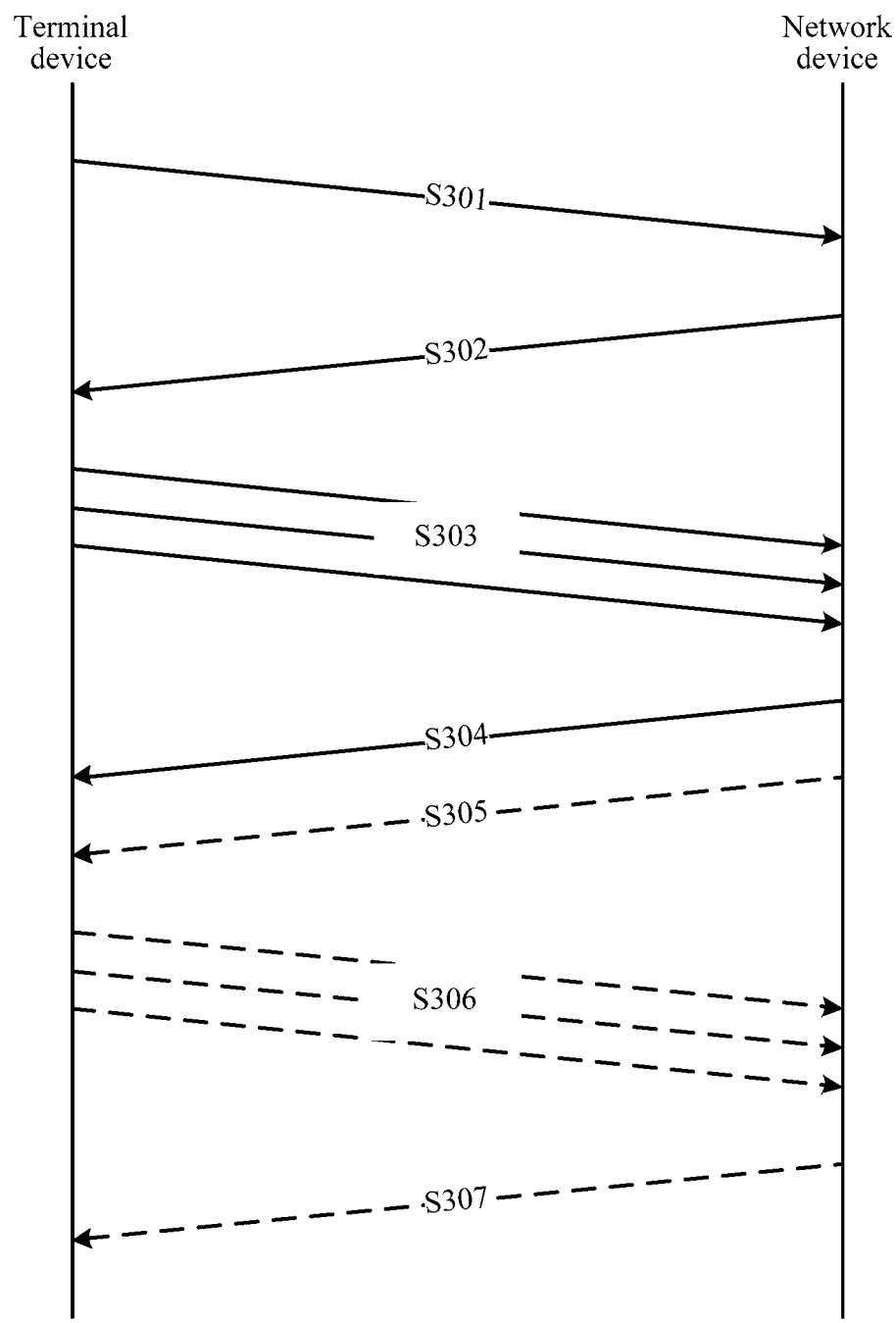
FIG. 6 is a schematic flowchart of an uplink data transmission method according to another embodiment of the present invention.

FIG. 6 is a schematic flowchart of an uplink data transmission method according to another embodiment of the present invention. As shown in FIG. 6, the method 300 includes the following steps.

S301: A network device (for example, a BS) receives report information sent by a terminal device (for example, UE).

Optionally, the report information may be transmitted by the terminal device on an uplink common channel, and include: enabling information of grant free transmission of the UE, for example, whether the grant free transmission is supported; and enabling information of grant free redundant transmission of the UE, for example, whether the grant free redundant transmission is supported, and a corresponding requirement of redundant transmission. In addition, the network device allocates, according to the report information of the terminal device and another system condition, a sequence number of a unique dedicated connection signature DCS to each terminal device, defines a CTU access region, and gives a unique CTU sequence number to each CTU in the access region.

S302: The network device sends grant free enabling information by using high-layer signaling.

Optionally, the network device may send the enabling information by using a broadcast channel. The enabling information may include enabling information of grant free transmission. The enabling information of the transmission includes information such as whether the network device supports the grant free transmission, a CTU access region, a quantity of CTUs in the CTU access region, a DCS of the UE, or a CTU-sequence-number mapping rule. The enabling information may further include enabling information of grant free redundant transmission. The enabling information of the grant free redundant transmission includes information such as whether the network device supports the grant free redundant transmission, or a modulation and coding scheme MCS supporting the grant free redundant transmission.

S303: The network device receives uplink data transmitted by the terminal device.

It should be understood that the uplink data includes uplink data transmitted by a terminal device that performs conventional transmission and uplink data transmitted by a terminal device that performs redundant transmission.

S304: The network device sends an ACK/NACK to the terminal device.

Optionally, after receiving the uplink data, the network device performs detection for a terminal device that performs conventional transmission or a terminal device that performs redundant transmission, and informs the terminal device by using the ACK/NACK of whether the uplink data is successfully transmitted.

Optionally, if the terminal device and the network device agree upon an ACK manner to acknowledge that reception detection succeeds, the network device sends an ACK to the terminal device after detection succeeds. If the terminal device does not receive an ACK within a particular time, it is considered that a conflict occurs in uplink transmission. If the terminal device and the network device agree upon a NACK manner to acknowledge that reception detection fails, the network device sends a NACK to the terminal device after detection fails. If the terminal device receives a NACK, it is considered that a conflict occurs in uplink transmission.

S305: The network device informs the terminal device of a CTU remapping rule by using high-layer signaling.

S306: The network device receives uplink data transmitted by the terminal device according to the CTU remapping rule.

S307: The network device sends an ACK/NACK to the terminal device.

Optionally, the uplink data transmission method 300 may not include S305. In this case, the CTU remapping rule may be a mapping rule that is stipulated in a standard or agreed upon by the network device and the terminal device beforehand. This is not limited in the present invention.

Figure 7:
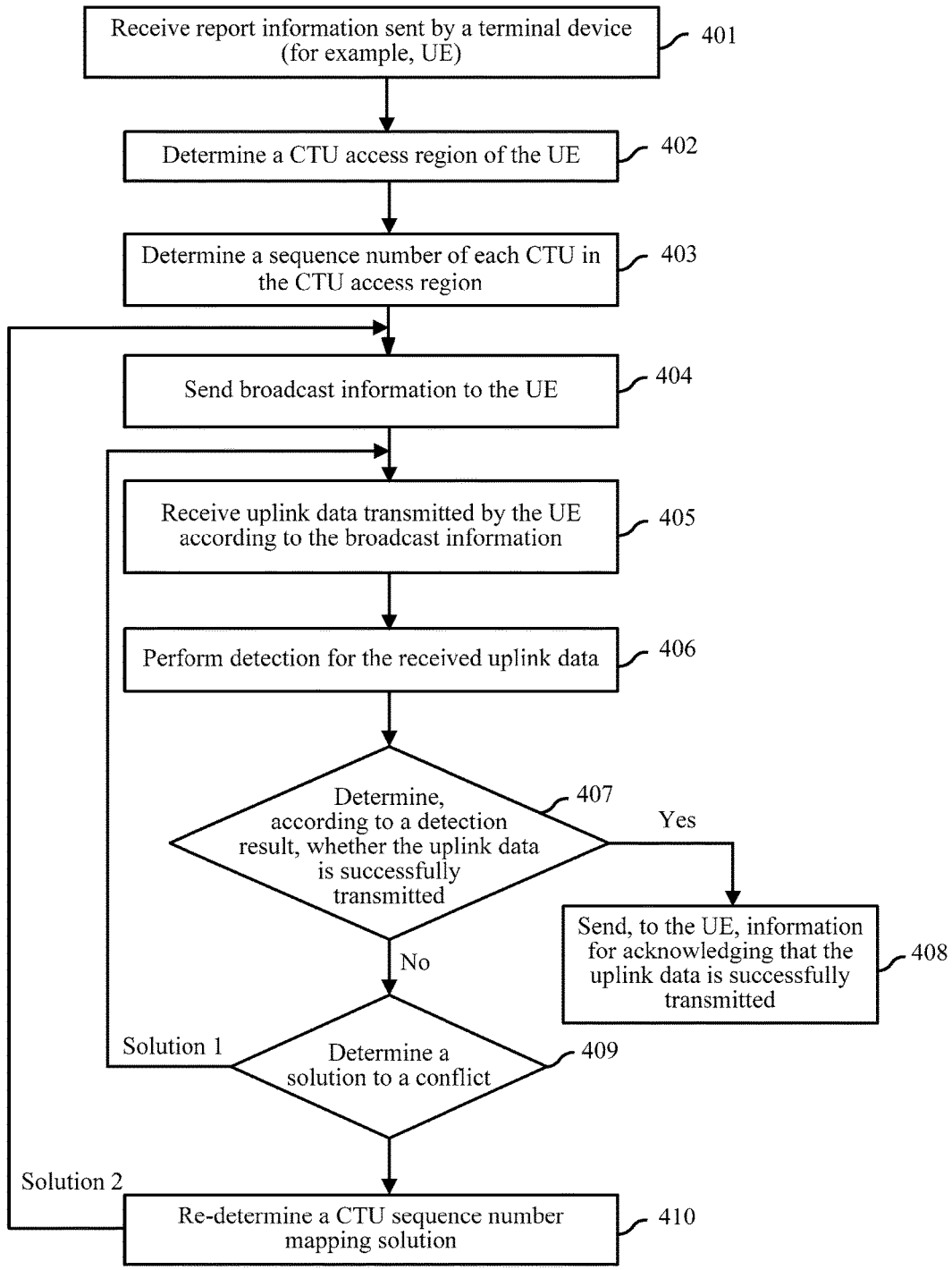
FIG. 7 is a schematic flowchart of an uplink data transmission method according to still another embodiment of the present invention.

FIG. 7 is a schematic flowchart of an uplink data transmission method according to still another embodiment of the present invention. As shown in FIG. 7, the method 400 may be performed by a network device, and the method 400 includes the following steps.

S401: Receive report information sent by a terminal device (for example, UE).

S402: Determine a CTU access region of the UE.

S403: Determine a sequence number of each CTU in the CTU access region.

S404: Send broadcast information to the UE.

S405: Receive uplink data transmitted by the UE according to the broadcast information.

S406: Perform detection for the received uplink data.

S407: Determine, according to a detection result, whether the uplink data is successfully transmitted.

S408: When determining that the uplink data is successfully transmitted, send, to the UE, information for acknowledging that the uplink data is successfully transmitted.

Optionally, when it is determined that the uplink data is not successfully transmitted, the process turns from S407 to S409: Determine a solution to a conflict.

Optionally, a first solution determined in S409 is: directly performing S405 and the subsequent steps.

Optionally, a second solution determined in S409 is: performing S410, re-determining a CTU-sequence-number mapping rule, and then, sequentially performing step S404 and subsequent steps.

It should be understood that content of information included in the related steps in the method 400 is the same as content of information included in the related steps in the method 300. To avoid repetition, details are not described herein again.

In this embodiment of the present invention, optionally, the foregoing operation steps and algorithms may be performed in a baseband unit (Baseband Unite, "BBU" for short) in the network device, or may be performed in a processing pool of a cloud communication center architecture (Cloud-RAN). However, the present invention is not limited thereto.

Therefore, by means of the uplink data transmission method in this embodiment of the present invention, a network device receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

The foregoing describes the uplink data transmission method according to the embodiments of the present invention in detail from a perspective of a network device with reference to FIG. 2 to FIG. 7. The following describes an uplink data transmission method according to the embodiments of the present invention in detail from a perspective of a terminal device with reference to FIG. 8 and FIG. 9. It should be understood that interaction between the terminal device and the network device and related characteristics and functions of the terminal device and the network device that are described from the perspective of the network device correspond to those described from the perspective of the terminal device. For brevity, repeated description is properly omitted.

FIG. 8 is a schematic flowchart of an uplink data transmission method according to still another embodiment of the present invention. The method is performed by a terminal device. As shown in FIG. 8, the method 500 includes the following steps.

S510: Send a first message including transmission mode information, where the transmission mode information is used to indicate that the terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

S520: Receive a second message including indication information, where the indication information is used to enable the terminal device to determine, according to the indication information, a CTU for uplink data transmission.

Specifically, the terminal device sends the first message including the transmission mode information to the network device. The transmission information indicates that the terminal device is capable of transmitting the uplink data by using the at least two CTUs that are in the same TTI, and the uplink data transmitted by using the at least two CTUs is partially same or totally same. Subsequently, the terminal device receives the second message that is sent by the network device and that includes the indication information, and the terminal device may determine, according to the indication information, the CTU for uplink data transmission.

Therefore, by means of the uplink data transmission method in this embodiment of the present invention, a terminal device sends a first message including transmission mode information to a network device, and receives a second message that is sent by the network device and that includes indication information, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

Optionally, in S520, the indication information includes at least one type of the following information: information about a dedicated connection signature DCS of the terminal device; information about a CTU; information about a quantity of CTUs that can be used for the terminal device to transmit the uplink data; information about a CTU access region; information about a quantity of CTUs in a CTU access region; information about a starting CTU in a CTU access region; or information about a CTU-sequence-number mapping rule.

It should be understood that the terminal device may determine the DCS by receiving a value of the DCS that is sent by the network device, or by receiving an index value that is of the DCS and that is sent by the network device. The information about the CTU may be specifically a CTU sequence number. The information about the CTU access region may be specifically a sequence number of the CTU access region. The information about the CTU-sequence-number mapping rule may be a specific mapping rule, or may be a sequence number corresponding to a specific mapping rule. For example, a set $\{f_{UE\text{-}CTU}(\cdot)\}$ of CTU-sequence-number mapping rules may be pre-defined in a stipulation of a standard or in a mutual agreement between two communication parties. The set of CTU-sequence-number mapping rules includes different CTU-sequence-number mapping rules. During communication, the terminal device may receive a sequence number that is sent by the network device and that corresponds to a mapping rule, and determines a specific to-be-used CTU-sequence-number mapping rule according to the sequence number. Alternatively, during communication, the terminal device may receive a specific CTU-sequence-number mapping rule sent by the network device, and directly determines, according to the CTU-sequence-number mapping rule, a CTU for uplink data transmission. This is not limited in the present invention.

Optionally, in S520, the information about the CTU-sequence-number mapping rule is a rule for determining a CTU sequence number according to any one or more of the following parameters: the information about the DCS of the terminal device; the quantity of CTUs that can be used for the terminal device to transmit the uplink data; the quantity of CTUs in the CTU access region; or a sequence number of the starting CTU in the CTU access region.

Optionally, in S520, the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{CTU}$ is the quantity of CTUs in the CTU access region.

Optionally, in S520, the CTU access region is a CTU access region used for redundant transmission. The redundant transmission may be understood as follows: Data transmitted during one data transmission includes at least first data and second data, and the second data and the first data are partially same or totally same. Alternatively, the CTU access region is a CTU access region used for reliable transmission, or the CTU access region is a CTU access region used for reliable ultra-low latency (Reliable Ultra-Low Latency, "RULL" for short) transmission. However, the present invention is not limited thereto.

Optionally, in S520, the information about the CTU-sequence-number mapping rule is a rule for determining a CTU sequence number according to any one or more of the following parameters: the information about the DCS of the terminal device; a quantity of CTUs that can be used for the terminal device to redundantly transmit the uplink data; a quantity of CTUs in the CTU access region used for redundant transmission; or a sequence number of a starting CTU in the CTU access region used for redundant transmission.

Optionally, in S520, the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{CTU}$ is the quantity of CTUs in the CTU access region used for redundant transmission.

In this embodiment of the present invention, optionally, the CTU access region includes one or multiple CTU access regions, and the multiple CTU access regions are CTU access regions belonging to a same TTI. That is, the terminal device may be mapped to multiple CTUs in a same TTI to transmit the uplink data.

In this embodiment of the present invention, optionally, the multiple CTU access regions further include CTU access regions belonging to different TTIs. That is, the terminal device may be mapped to CTUs that are in different TTIs to transmit the uplink data.

In this embodiment of the present invention, optionally, the uplink data transmitted by using the at least two CTUs is data to be retransmitted. That is, the terminal device may determine, according to the indication information, a CTU for initial transmission and a CTU for retransmission. When determining that the initial transmission fails, the terminal device determines, according to the indication information, the CTU for retransmission to transmit the data to be retransmitted.

In this embodiment of the present invention, optionally, when the terminal device fails to transmit the uplink data, the terminal device may further determine, according to a new CTU-sequence-number mapping rule, a CTU for retransmission. The new CTU-sequence-number mapping rule may be stipulated in a standard or agreed upon by the UE and the network device beforehand, or may be sent by the network device to the UE by using a broadcast channel or another downlink channel. For example, when the terminal device fails to transmit the uplink data, the terminal device may receive a message that is sent by the network device and that includes a CTU remapping rule. The terminal device determines, according to the CTU remapping rule, a CTU for retransmission. This is not limited in the present invention.

In this embodiment of the present invention, optionally, the uplink data transmission is grant free transmission.

Optionally, the method in this embodiment of the present invention is applicable to any one or more of the following fields: a device to device D2D field, a machine to machine M2M field, or a machine type communication MTC field. However, the present invention is not limited thereto.

Figure 9:
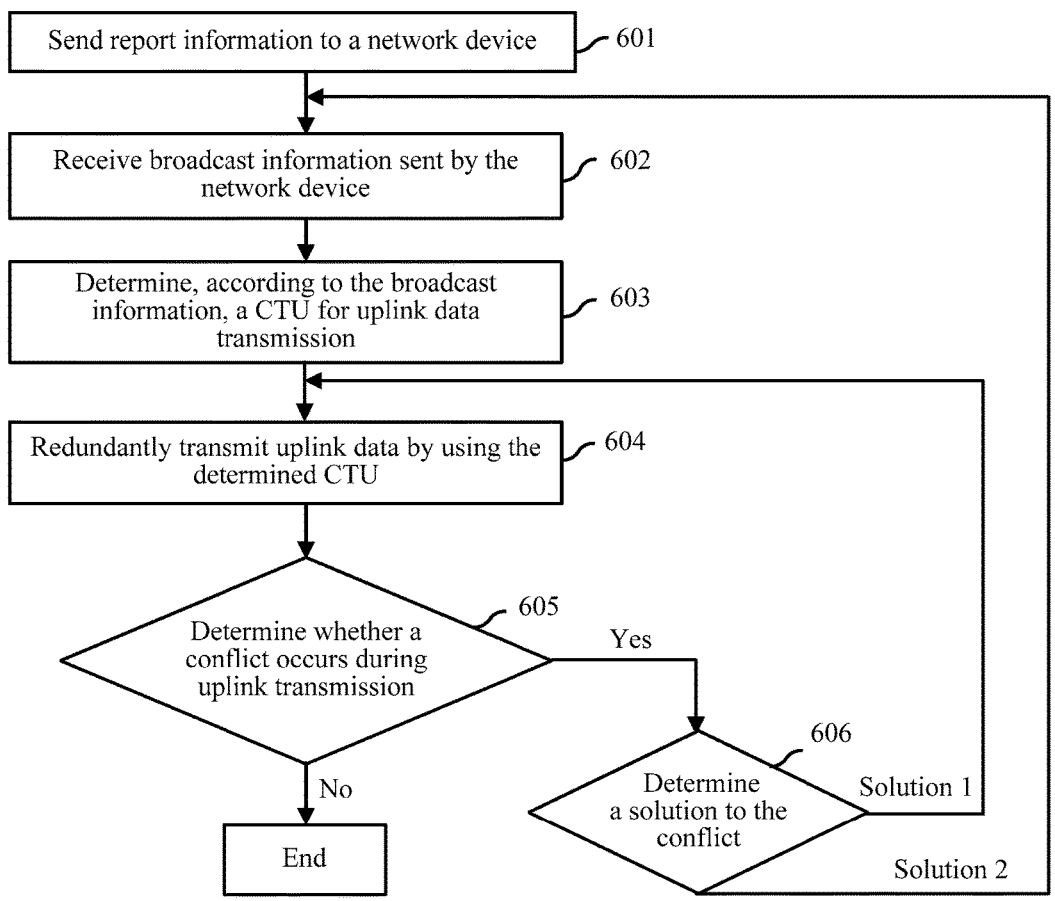
FIG. 9 is a schematic flowchart of an uplink data transmission method according to still another embodiment of the present invention.

FIG. 9 is a schematic flowchart of an uplink data transmission method according to still another embodiment of the present invention. As shown in FIG. 9, the method 600 may be performed by a terminal device, and the method 600 includes the following steps.

S601: Send report information to a network device.

S602: Receive broadcast information sent by the network device.

S603: Determine, according to the broadcast information, a CTU for uplink data transmission.

S604: Redundantly transmit the uplink data by using the determined CTU.

S605: Determine whether a conflict occurs during uplink transmission.

S606: Determine a solution to the conflict when the conflict occurs.

Optionally, a first solution determined in S606 is: directly performing S604 and the subsequent steps.

Optionally, a second solution determined in S606 is: directly performing S602 and the subsequent steps.

Optionally, in S601, UE may transmit the report information to the network device on an uplink common channel. The report information may include enabling information of grant free transmission of the UE, for example, whether the grant free transmission is supported, and further includes enabling information of grant free redundant transmission of the UE, for example, whether the grant free redundant transmission is supported, and a corresponding requirement of redundant transmission.

Optionally, in S602, the broadcast information received by the UE may include enabling information of grant free transmission. The enabling information of the transmission includes information such as whether the network device supports the grant free transmission, a CTU access region, a quantity of CTUs in the CTU access region, a DCS of the UE, or a CTU-sequence-number mapping rule. The broadcast information received by the UE may also include enabling information of grant free redundant transmission. The enabling information of grant free redundant transmission includes information such as whether the network device supports the grant free redundant transmission, or a modulation and coding scheme MCS supporting the grant free redundant transmission.

Optionally, in S605, if the UE and the network device agree upon an ACK manner to acknowledge that reception detection succeeds, the network device sends an ACK to the UE after detection succeeds. If the UE does not receive an ACK within a particular time, it is considered that a conflict occurs in uplink transmission. If the UE and the network device agree upon a NACK manner to acknowledge that reception detection fails, the network device sends a NACK to the UE after detection fails. If the UE receives a NACK, it is considered that a conflict occurs in uplink transmission.

It should be understood that in this embodiment of the present invention, the foregoing operation steps and algorithms that are related to the UE may be performed on a CPU at the UE end. However, the present invention is not limited thereto.

Therefore, by means of the uplink data transmission method in this embodiment of the present invention, a terminal device sends a first message including transmission mode information to a network device, and receives a second message that is sent by the network device and that includes indication information, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

The foregoing describes the uplink data transmission method according to the embodiments of the present invention in detail with reference to FIG. 2 to FIG. 9, and the following describes an uplink data transmission apparatus according to embodiments of the present invention in detail with reference to FIG. 10 to FIG. 13.

Figure 10:
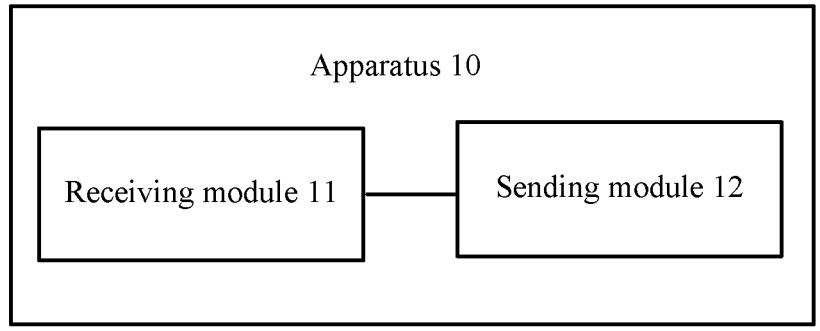
FIG. 10 is a schematic block diagram of an uplink data transmission apparatus according to an embodiment of the present invention.

FIG. 10 shows an uplink data transmission apparatus according to an embodiment of the present invention. As shown in FIG. 10, the apparatus 10 includes:

a receiving module 11, configured to receive a first message including transmission mode information, where the transmission mode information is used to indicate that a terminal device is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same; and a sending module 12, configured to send a second message including indication information, where the indication information is used to enable the terminal device to determine, according to the indication information, a CTU for uplink data transmission.

Therefore, the uplink data transmission apparatus in this embodiment of the present invention receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

In this embodiment of the present invention, optionally, the indication information includes at least one type of the following information: information about a dedicated connection signature DCS of the terminal device; information about a CTU; information about a quantity of CTUs that can be used for the terminal device to transmit the uplink data; information about a CTU access region; information about a quantity of CTUs in a CTU access region; information about a starting CTU in a CTU access region; or information about a CTU-sequence-number mapping rule.

In this embodiment of the present invention, optionally, the information about the CTU-sequence-number mapping rule is a rule for determining a CTU sequence number according to any one or more of the following parameters: the information about the DCS of the terminal device; the quantity of CTUs that can be used for the terminal device to transmit the uplink data, the quantity of CTUs in the CTU access region; or a sequence number of the starting CTU in the CTU access region.

In this embodiment of the present invention, optionally, the rule for determining the CTU sequence number is any one or more of the following formulas:

$$I_{CTU\text{-}ij}=(I_{CTU\text{-}INT}+DCS_i+j) \bmod N_{CTU}, \text{ or}$$

$$I_{CTU\text{-}ij}=f(I_{CTU\text{-}INT}+DCS_i+j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{CTU}$ is the quantity of CTUs in the CTU access region.

In this embodiment of the present invention, optionally, the CTU access region is a CTU access region used for redundant transmission.

In this embodiment of the present invention, optionally, the information about the CTU-sequence-number mapping rule is a rule for determining a CTU sequence number according to any one or more of the following parameters: the information about the DCS of the terminal device; a quantity of CTUs that can be used for the terminal device to redundantly transmit the uplink data; a quantity of CTUs in the CTU access region used for redundant transmission; or a sequence number of a starting CTU in the CTU access region used for redundant transmission.

In this embodiment of the present invention, optionally, the rule for determining the CTU sequence number is any one or more of the following formulas:

$$I_{CTU\text{-}ij}=(I_{CTU\text{-}INT}+DCS_i+j) \bmod N_{CTU}, \text{ or}$$

$$I_{CTU\text{-}ij}=f(I_{CTU\text{-}INT}+DCS_i+j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{CTU}$ is the quantity of CTUs in the CTU access region used for redundant transmission.

In this embodiment of the present invention, optionally, the CTU access region includes one or multiple CTU access regions, and the multiple CTU access regions are CTU access regions belonging to a same TTI.

In this embodiment of the present invention, optionally, the multiple CTU access regions further include CTU access regions belonging to different TTIs.

In this embodiment of the present invention, optionally, the uplink data transmitted by using the at least two CTUs is data to be retransmitted.

In this embodiment of the present invention, optionally, the uplink data transmission is grant free transmission.

In this embodiment of the present invention, optionally, the apparatus is applicable to any one or more of the following fields: a device to device D2D field, a machine to machine M2M field, or a machine type communication MTC field.

In this embodiment of the present invention, optionally, the apparatus is a network device.

In this embodiment of the present invention, optionally, the foregoing operation steps and algorithms may be performed in a baseband unit (Baseband Unite, "BBU" for short) in the network device, or may be performed in a processing pool of a cloud communication center architecture (Cloud-RAN). However, the present invention is not limited thereto.

It should be understood that the uplink data transmission apparatus 10 according to this embodiment of the present invention may correspondingly perform the uplink data transmission method 200 in the embodiments of the present invention. The foregoing and other operations and/or functions of the modules in the apparatus 10 are respectively intended to implement corresponding procedures in the method in FIG. 2. For brevity, details are not described herein again.

Therefore, the uplink data transmission apparatus in this embodiment of the present invention receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

Figure 11:
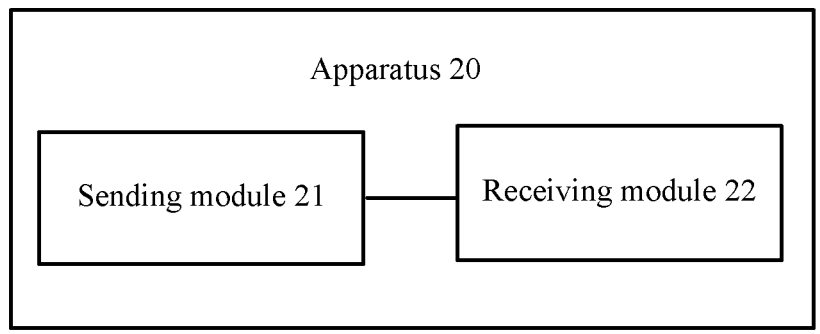
FIG. 11 is a schematic block diagram of an uplink data transmission apparatus according to an embodiment of the present invention.

FIG. 11 shows an uplink data transmission apparatus according to another embodiment of the present invention. As shown in FIG. 11, the apparatus 20 includes:

a sending module 21, configured to send a first message including transmission mode information, where the transmission mode information is used to indicate that the apparatus is capable of transmitting uplink data by using at least two contention transmission units CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same; and a receiving module 22, configured to receive a second message including indication information, where the indication information is used to enable the apparatus to determine, according to the indication information, a CTU for uplink data transmission.

Therefore, the uplink data transmission apparatus in this embodiment of the present invention sends a first message including transmission mode information to a network device, and receives a second message that is sent by the network device and that includes indication information, so that the apparatus may determine, according to the indication information, a CTU for uplink data transmission. The apparatus is capable of transmitting uplink data by using at least two CTUs that are in a same TTI. Therefore, reliability of data transmission can be improved, and a transmission latency can be reduced.

In this embodiment of the present invention, optionally, the indication information includes at least one type of the following information: information about a dedicated connection signature DCS of the apparatus; information about a CTU; information about a quantity of CTUs that can be used for the apparatus to transmit the uplink data; information about a CTU access region; information about a quantity of CTUs in a CTU access region; information about a starting CTU in a CTU access region; or information about a CTU-sequence-number mapping rule.

In this embodiment of the present invention, optionally, the information about the CTU-sequence-number mapping rule is a rule for determining a CTU sequence number according to any one or more of the following parameters: the information about the DCS of the apparatus; the quantity of CTUs that can be used for the apparatus to transmit the uplink data, the quantity of CTUs in the CTU access region; or a sequence number of the starting CTU in the CTU access region.

In this embodiment of the present invention, optionally, the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of an apparatus $UE_i$, $\Delta_i$ is a quantity of CTUs that can be used for $UE_i$ to transmit uplink data, and $N_{CTU}$ is the quantity of CTUs in the CTU access region.

In this embodiment of the present invention, optionally, the CTU access region is a CTU access region used for redundant transmission.

In this embodiment of the present invention, optionally, the information about the CTU-sequence-number mapping rule is a rule for determining a CTU sequence number according to any one or more of the following parameters: the information about the DCS of the apparatus; a quantity of CTUs that can be used for the apparatus to redundantly transmit the uplink data, a quantity of CTUs in the CTU access region used for redundant transmission; or a sequence number of a starting CTU in the CTU access region used for redundant transmission.

In this embodiment of the present invention, optionally, the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of an apparatus $UE_i$, $\Delta_i$ is a quantity of CTUs that can be used for $UE_i$ to redundantly transmit uplink data, and $N_{CTU}$ is the quantity of CTUs in the CTU access region used for redundant transmission.

In this embodiment of the present invention, optionally, the CTU access region includes one or multiple CTU access regions, and the multiple CTU access regions are CTU access regions belonging to a same TTI.

In this embodiment of the present invention, optionally, the multiple CTU access regions further include CTU access regions belonging to different TTIs.

In this embodiment of the present invention, optionally, the uplink data transmitted by using the at least two CTUs is data to be retransmitted.

In this embodiment of the present invention, optionally, the uplink data transmission is grant free transmission.

In this embodiment of the present invention, optionally, the apparatus in this embodiment of the present invention is applicable to any one or more of the following fields: a device to device D2D field, a machine to machine M2M field, or a machine type communication MTC field.

In this embodiment of the present invention, optionally, the apparatus is a terminal device.

In this embodiment of the present invention, optionally, the foregoing operation steps and algorithms may be performed on a CPU of the apparatus. However, the present invention is not limited thereto.

It should be understood that the uplink data transmission apparatus 20 according to this embodiment of the present invention may correspondingly perform the uplink data transmission method 500 in the embodiments of the present invention. The foregoing and other operations and/or functions of the modules in the apparatus 20 are respectively intended to implement corresponding procedures in the method in FIG. 8. For brevity, details are not described herein again.

Therefore, the uplink data transmission apparatus in this embodiment of the present invention sends a first message including transmission mode information to a network device, and receives a second message that is sent by the network device and that includes indication information, so that the apparatus may determine, according to the indication information, a CTU for uplink data transmission. The apparatus is capable of transmitting uplink data by using at least two CTUs that are in a same TTI. Therefore, reliability of data transmission can be improved, and a transmission latency can be reduced.

Figure 12:
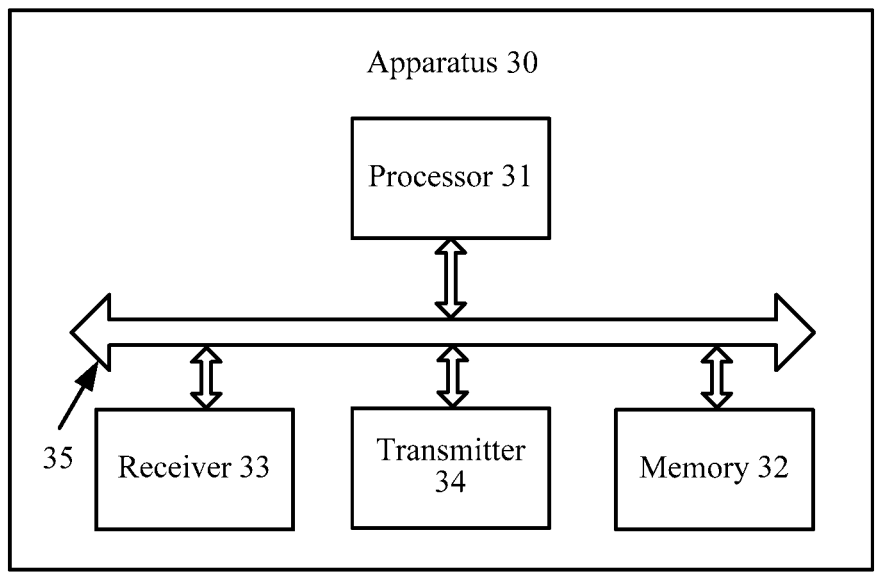
FIG. 12 is a schematic block diagram of an uplink data transmission apparatus according to another embodiment of the present invention.

As shown in FIG. 12, an embodiment of the present invention further provides an uplink data transmission apparatus 30. The apparatus 30 includes a processor 31, a memory 32, a receiver 33, a transmitter 34, and a bus system 35. The bus system 35 is optional. The processor 31, the memory 32, the receiver 33, and the transmitter 34 may be connected by using the bus system 35. The memory 32 is configured to store an instruction. The processor 31 is configured to execute the instruction stored in the memory 32, to control the receiver 33 to receive a signal and the transmitter 34 to send a signal. The receiver 33 is configured to receive a first message including transmission mode information. The transmission mode information is used to indicate that a terminal device is capable of transmitting uplink data by using at least two contention transmission units CTUs that are in a same time interval TTI. The CTU refers to a transmission resource combining a time, a frequency, and a code domain, or a transmission resource combining a time, a frequency, and a pilot, or a transmission resource combining a time, a frequency, a code domain, and a pilot. The uplink data transmitted by using the at least two CTUs is partially same or totally same. The transmitter 34 is configured to send a second message including indication information. The indication information is used to enable the terminal device to determine, according to the indication information, a CTU for uplink data transmission.

Therefore, the uplink data transmission apparatus in this embodiment of the present invention receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

It should be understood that in this embodiment of the present invention, the processor 31 may be a central processing unit (Central Processing Unit, "CPU" for short), or the processor 31 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

The memory 32 may include a read-only memory and a random access memory, and provides an instruction and data to the processor 31. A part of the memory 32 may further include a non-volatile random access memory. For example, the memory 32 may further store device type information.

The bus system 35 may further include a power bus, a control bus, a status signal bus, and the like in addition to a data bus. However, for clear description, various types of buses in the figure are marked as the bus system 35.

During implementation, the steps of the foregoing method may be completed by using an integrated logical circuit of hardware in the processor 31 or an instruction in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, for example, a random access memory, a flash memory, a read-only memory, a programmable read-only memory, an electrically-erasable programmable memory, or a register. The storage medium is located in the memory 32, and the processor 31 reads information in the memory 32 and completes the steps of the foregoing method in combination with hardware of the processor 420. To avoid repetition, details are not described herein again.

Optionally, in an embodiment, the indication information includes at least one type of the following information: information about a dedicated connection signature DCS of the terminal device; information about a CTU; information about a quantity of CTUs that can be used for the terminal device to transmit the uplink data; information about a CTU access region; information about a quantity of CTUs in a CTU access region; information about a starting CTU in a CTU access region; or information about a CTU-sequence-number mapping rule.

Optionally, in an embodiment, the information about the CTU-sequence-number mapping rule is a rule for determining a CTU sequence number according to any one or more of the following parameters: the information about the DCS of the terminal device; the quantity of CTUs that can be used for the terminal device to transmit the uplink data; the quantity of CTUs in the CTU access region; or a sequence number of the starting CTU in the CTU access region.

Optionally, in an embodiment, the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{CTU}$ is the quantity of CTUs in the CTU access region.

Optionally, in an embodiment, the CTU access region is a CTU access region used for redundant transmission.

Optionally, in an embodiment, the information about the CTU-sequence-number mapping rule is a rule for determining a CTU sequence number according to any one or more of the following parameters: the information about the DCS of the terminal device; a quantity of CTUs that can be used for the terminal device to redundantly transmit the uplink data; a quantity of CTUs in the CTU access region used for redundant transmission; or a sequence number of a starting CTU in the CTU access region used for redundant transmission.

Optionally, in an embodiment, the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{CTU}$ is the quantity of CTUs in the CTU access region used for redundant transmission.

Optionally, in an embodiment, the CTU access region includes one or multiple CTU access regions, and the multiple CTU access regions are CTU access regions belonging to a same TTI.

Optionally, in an embodiment, the multiple CTU access regions further include CTU access regions belonging to different TTIs.

Optionally, in an embodiment, the uplink data transmitted by using the at least two CTUs is data to be retransmitted.

Optionally, in an embodiment, the uplink data transmission is grant free transmission.

Optionally, in an embodiment, the apparatus is applicable to any one or more of the following fields: a device to device D2D field, a machine to machine M2M field, or a machine type communication MTC field.

In this embodiment of the present invention, optionally, the apparatus is a network device.

It should be understood that the uplink data transmission apparatus 30 according to this embodiment of the present invention may correspond to the uplink data transmission apparatus 10 in the embodiments of the present invention, and may correspond to a corresponding subject in the method according to the embodiments of the present invention. The foregoing and other operations and/or functions of the modules in the apparatus 30 are respectively intended to implement corresponding procedures in the method in FIG. 2. For brevity, details are not described herein again.

Therefore, the uplink data transmission apparatus in this embodiment of the present invention receives a first message that is sent by a terminal device and that includes transmission mode information, and sends a second message including indication information to the terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

Figure 13:
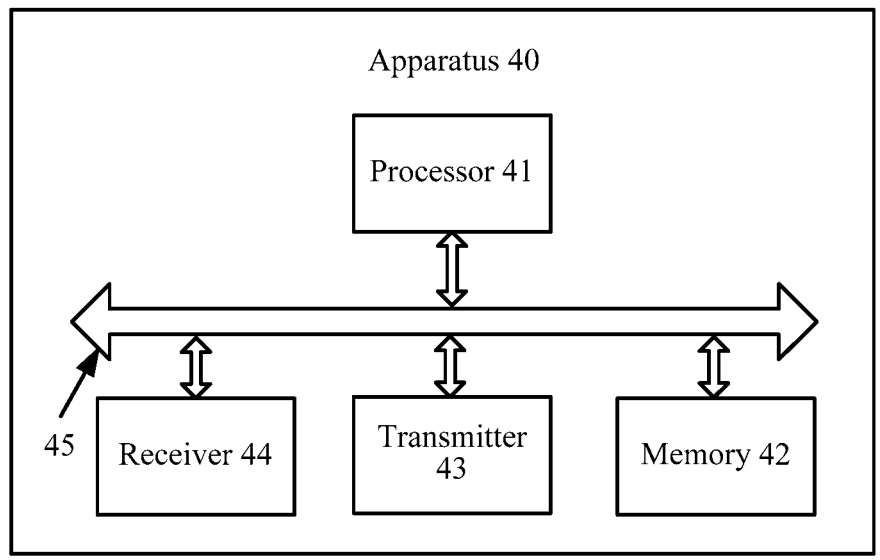
FIG. 13 is a schematic block diagram of an uplink data transmission apparatus according to another embodiment of the present invention.

As shown in FIG. 13, an embodiment of the present invention further provides an uplink data transmission apparatus 40. The apparatus 40 includes a processor 41, a memory 42, a transmitter 43, a receiver 44, and a bus system 45. The bus system 45 is optional. The processor 41, the memory 42, the transmitter 43, and the receiver 44 may be connected by using the bus system 45. The memory 42 is configured to store an instruction. The processor 41 is configured to execute the instruction stored in the memory 42, to control the transmitter 43 to send a signal and the receiver 44 to receive a signal. The transmitter 43 is configured to send a first message including transmission mode information. The transmission mode information is used to indicate that the apparatus is capable of transmitting uplink data by using at least two contention transmission units CTUs that are in a same time interval TTI. The CTU refers to a transmission resource combining a time, a frequency, and a code domain, or a transmission resource combining a time, a frequency, and a pilot, or a transmission resource combining a time, a frequency, a code domain, and a pilot. The uplink data transmitted by using the at least two CTUs is partially same or totally same. The receiver 44 is configured to receive a second message including indication information. The indication information is used to enable the apparatus to determine, according to the indication information, a CTU for uplink data transmission.

Therefore, the uplink data transmission apparatus in this embodiment of the present invention sends a first message including transmission mode information to a network device, and receives a second message that is sent by the network device and that includes indication information, so that the apparatus may determine, according to the indication information, a CTU for uplink data transmission. The apparatus is capable of transmitting uplink data by using at least two CTUs that are in a same TTI. Therefore, reliability of data transmission can be improved, and a transmission latency can be reduced.

It should be understood that in this embodiment of the present invention, the processor 41 may be a central processing unit (Central Processing Unit, "CPU" for short), or the processor 41 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

The memory 42 may include a read-only memory and a random access memory, and provides an instruction and data to the processor 41. A part of the memory 42 may further include a non-volatile random access memory. For example, the memory 42 may further store device type information.

The bus system 45 may further include a power bus, a control bus, a status signal bus, and the like in addition to a data bus. However, for clear description, various types of buses in the figure are marked as the bus system 45.

During implementation, the steps of the foregoing method may be completed by using an integrated logical circuit of hardware in the processor 41 or an instruction in a form of software. Steps of the method disclosed with reference to the embodiments of the present invention may be directly performed and completed by means of a hardware processor, or may be performed and completed by using a combination of hardware and software modules in the processor. The software module may be located in a mature storage medium in the field, for example, a random access memory, a flash memory, a read-only memory, a programmable read-only memory, an electrically-erasable programmable memory, or a register. The storage medium is located in the memory 42, and the processor 41 reads information in the memory 42 and completes the steps of the foregoing method in combination with hardware of the processor 420. To avoid repetition, details are not described herein again.

Optionally, in an embodiment, the indication information includes at least one type of the following information: information about a dedicated connection signature DCS of the apparatus; information about a CTU; information about a quantity of CTUs that can be used for the apparatus to transmit the uplink data; information about a CTU access region; information about a quantity of CTUs in a CTU access region; information about a starting CTU in a CTU access region; or information about a CTU-sequence-number mapping rule.

Optionally, in an embodiment, the information about the CTU-sequence-number mapping rule is a rule for determining a CTU sequence number according to any one or more of the following parameters: the information about the DCS of the apparatus; the quantity of CTUs that can be used for the apparatus to transmit the uplink data; the quantity of CTUs in the CTU access region; or a sequence number of the starting CTU in the CTU access region.

Optionally, in an embodiment, the rule for determining the CTU sequence number is any one or more of the following formulas:

$$I_{CTU\text{-}ij}=(I_{CTU\text{-}INT}+DCS_i+j) \bmod N_{CTU}, \text{ or}$$

$$I_{CTU\text{-}ij}=f(I_{CTU\text{-}INT}+DCS_i+j) \bmod N_{CTU},$$

where $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of an apparatus $UE_i$, $\Delta_i$ is a quantity of CTUs that can be used for $UE_i$ to transmit uplink data, and $N_{CTU}$ is the quantity of CTUs in the CTU access region.

Optionally, in an embodiment, the CTU access region is a CTU access region used for redundant transmission.

Optionally, in an embodiment, the information about the CTU-sequence-number mapping rule is a rule for determining a CTU sequence number according to any one or more of the following parameters: the information about the DCS of the apparatus; a quantity of CTUs that can be used for the apparatus to redundantly transmit the uplink data; a quantity of CTUs in the CTU access region used for redundant transmission; or a sequence number of a starting CTU in the CTU access region used for redundant transmission.

Optionally, in an embodiment, the rule for determining the CTU sequence number is any one or more of the following formulas:

$$I_{CTU-ij} = (I_{CTU-INT} + DCS_i + j) \bmod N_{CTU}, \text{ or}$$

$$I_{CTU-ij} = f(I_{CTU-INT} + DCS_i + j) \bmod N_{CTU},$$

where $j=0, 1, \ldots, \Delta_i-1$, $DCS_1=0$, $DCS_{i-1}$, $\Delta_{i-1}, i=2, 3, \ldots$, $f(\cdot)$ is an interleaving function, an interleaving range is $[0, \ldots, N_{CTU}-1]$, $I_{CTU-ij}$ is a CTU sequence number, $I_{CTU-INT}$ is the sequence number of the starting CTU in the CTU access region used for redundant transmission, $DCS_i$ is a DCS of an apparatus $UE_i$, $\Delta_i$ is a quantity of CTUs that can be used for $UE_i$ to redundantly transmit uplink data, and $N_{CTU}$ is the quantity of CTUs in the CTU access region used for redundant transmission.

Optionally, in an embodiment, the CTU access region includes one or multiple CTU access regions, and the multiple CTU access regions are CTU access regions belonging to a same TTI.

Optionally, in an embodiment, the multiple CTU access regions further include CTU access regions belonging to different TTIs.

Optionally, in an embodiment, the uplink data transmitted by using the at least two CTUs is data to be retransmitted.

Optionally, in an embodiment, the uplink data transmission is grant free transmission.

Optionally, in an embodiment, the apparatus is applicable to any one or more of the following fields: a device to device D2D field, a machine to machine M2M field, or a machine type communication MTC field.

In this embodiment of the present invention, optionally, the apparatus is a terminal device.

It should be understood that the uplink data transmission apparatus 40 according to this embodiment of the present invention may correspond to the uplink data transmission apparatus 20 in the embodiments of the present invention, and may correspond to a corresponding subject in the method according to the embodiments of the present invention. The foregoing and other operations and/or functions of the modules in the apparatus 40 are respectively intended to implement corresponding procedures in the method in FIG. 8. For brevity, details are not described herein again.

Therefore, the uplink data transmission apparatus in this embodiment of the present invention sends a first message including transmission mode information to a network device, and receives a second message that is sent by the network device and that includes indication information, so that the apparatus may determine, according to the indication information, a CTU for uplink data transmission. The apparatus is capable of transmitting uplink data by using at least two CTUs that are in a same TTI. Therefore, reliability of data transmission can be improved, and a transmission latency can be reduced.

The foregoing embodiments have already described the first message and the second message. To make the solutions clearer, the applicant adds the following description.

Figure 14:
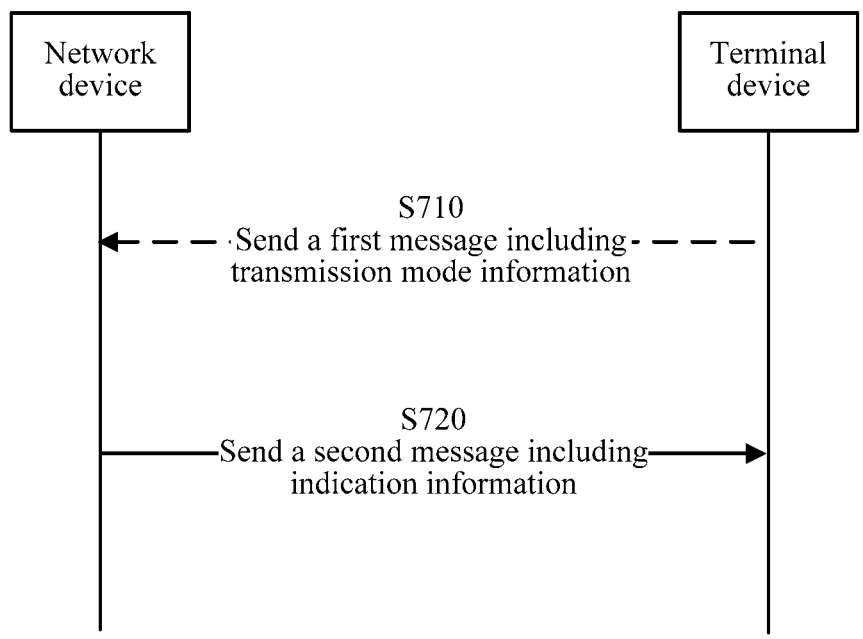
FIG. 14 is a schematic flowchart of an uplink data transmission method according to still another embodiment of the present invention.

FIG. 14 shows an uplink data transmission method according to an embodiment of the present invention. Description of the foregoing method embodiments and the apparatus embodiments may also be applicable to the embodiment in FIG. 14, and details are not described herein again. As shown in FIG. 14, the method 700 includes:

S720: A network device sends a second message including indication information to a terminal device, where the indication information is used to enable the terminal device to determine, according to the indication information, a contention transmission unit CTU for uplink data transmission, the uplink data transmission is transmitting uplink data by using at least two CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

Optionally, the terminal may receive the second message that is sent by the network device and that includes the indication information, and details are not described herein again.

For ease of understanding, description instead of a solution is added herein. The "at least two CTUs" described in the embodiments of this application may be at least two CTUs in which at least one of elements forming one of the at least two CTUs is different from at least one of elements forming another one of the at least two CTUs. For example, if the CTU refers to a transmission resource combining a time, a frequency, and a code domain, the at least two CTUs possibly include, but are not limited to: (1) at least two CTUs with different frequencies, for example, transmission resources that have a same time and a same code domain but have different frequencies; (2) at least two CTUs with different code domains, for example, transmission resources that have a same time and a same frequency but have different code domains; (3) at least two CTUs with different times, for example, transmission resources that have a same frequency and a same code domain but have different times; or (4) at least two CTUs with different frequencies and code domains, for example, transmission resources that have a same time, but have different frequencies and different code domains.

Optionally, the method further includes:

S710: The network device receives a first message that is sent by the terminal device and that includes transmission mode information, where the transmission mode information is used to indicate that the terminal device is capable of transmitting uplink data by using at least two CTUs that are in a same TTI.

It may be understood that the method 700 may not include S710. It may be understood that the terminal device may not send the first message to the network device. In this case, the network device may consider by default that all terminal devices support grant free redundant transmission, and the network device sends the second message including the indication information to all the terminal devices. Optionally, when a terminal device is incapable of redundant transmission, the terminal device may determine, according to the indication information, a CTU for conventional transmission, and perform initial transmission or retransmission.

Optionally, the terminal device sends the first message in a manner in which the first message is included in signaling sent to the network device during initial access, or the network device may send the second message in a manner in which the second message is included in signaling sent to the terminal device during initial access. Alternatively, the terminal device sends the first message in a manner in which the first message is included in signaling sent to the network device during random access, or the network device may send the second message in a manner in which the second message is included in signaling sent to the terminal device during random access.

Figure 15:
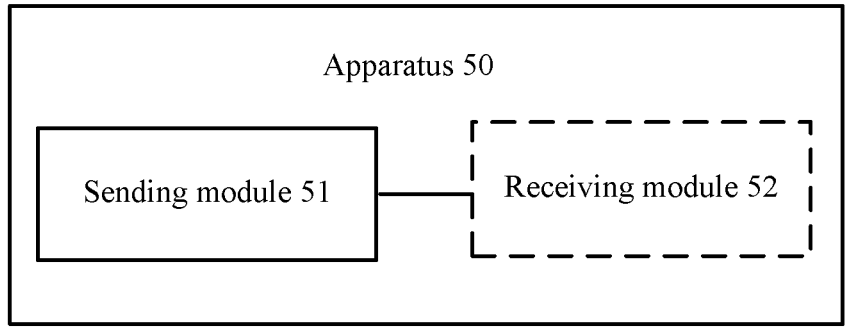
FIG. 15 is a schematic block diagram of an uplink data transmission apparatus according to still another embodiment of the present invention.

FIG. 15 shows an uplink data transmission apparatus according to still another embodiment of the present invention. As shown in FIG. 15, the apparatus 50 includes:

a sending module 51, configured to send a second message including indication information, where the indication information is used to enable a terminal device to determine, according to the indication information, a contention transmission unit CTU for uplink data transmission, the uplink data transmission is transmitting uplink data by using at least two CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

Therefore, the uplink data transmission apparatus in this embodiment of the present invention sends a second message including indication information to a terminal device, so that the terminal device may determine, according to the indication information, a CTU for uplink data transmission. The terminal device is capable of transmitting uplink data by using at least two CTUs that are in a same TTI. Therefore, reliability of data transmission can be improved, and a transmission latency can be reduced.

In this embodiment of the present invention, optionally, as shown in FIG. 15, the apparatus 50 further includes: a receiving module 52. Before the sending module 51 sends the second message including the indication information, the receiving module 52 is configured to receive a first message including transmission mode information. The transmission mode information is used to indicate that the terminal device is capable of transmitting uplink data by using at least two CTUs that are in a same TTI.

It should be understood that the uplink data transmission apparatus 50 according to this embodiment of the present invention may correspond to the network device in the method 700. The foregoing and other operations and/or functions of the modules in the apparatus 50 are respectively intended to implement corresponding procedures in the method in FIG. 14. For brevity, details are not described herein again.

Figure 16:
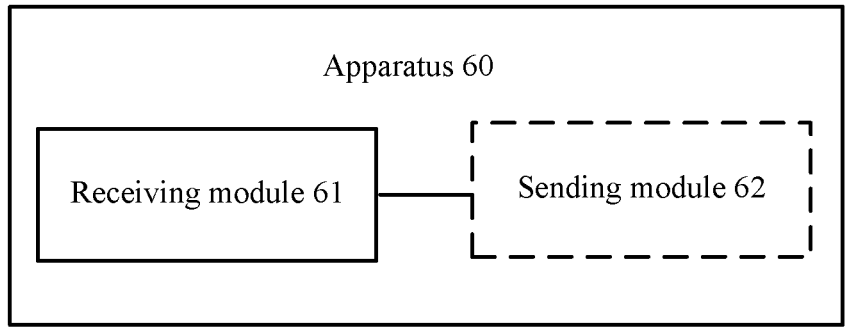
FIG. 16 is a schematic block diagram of an uplink data transmission apparatus according to still another embodiment of the present invention.

The following describes an uplink data transmission apparatus according to still another embodiment of the present invention with reference to FIG. 16. As shown in FIG. 16, the apparatus 60 includes:

a receiving module 61, configured to receive a second message including indication information, where the indication information is used to enable the apparatus to determine, according to the indication information, a contention transmission unit CTU for uplink data transmission, the uplink data transmission is transmitting uplink data by using at least two CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

Therefore, the uplink data transmission apparatus in this embodiment of the present invention receives a second message including indication information, and can determine, according to the indication information, a CTU for uplink data transmission. The apparatus is capable of transmitting uplink data by using at least two CTUs that are in a same TTI. Therefore, reliability of data transmission can be improved, and a transmission latency can be reduced.

In this embodiment of the present invention, optionally, as shown in FIG. 16, the apparatus 60 further includes: a sending module 62. Before the receiving module 61 receives the second message including the indication information, the sending module 62 is configured to send a first message including transmission mode information. The transmission mode information is used to indicate that the apparatus is capable of transmitting uplink data by using at least two CTUs that are in a same TTI.

It should be understood that the uplink data transmission apparatus 60 according to this embodiment of the present invention may correspond to the terminal device in the uplink data transmission method 700 in the embodiments of the present invention. The foregoing and other operations and/or functions of the modules in the apparatus 60 are respectively intended to implement corresponding procedures in the method in FIG. 14. For brevity, details are not described herein again.

Figure 17:
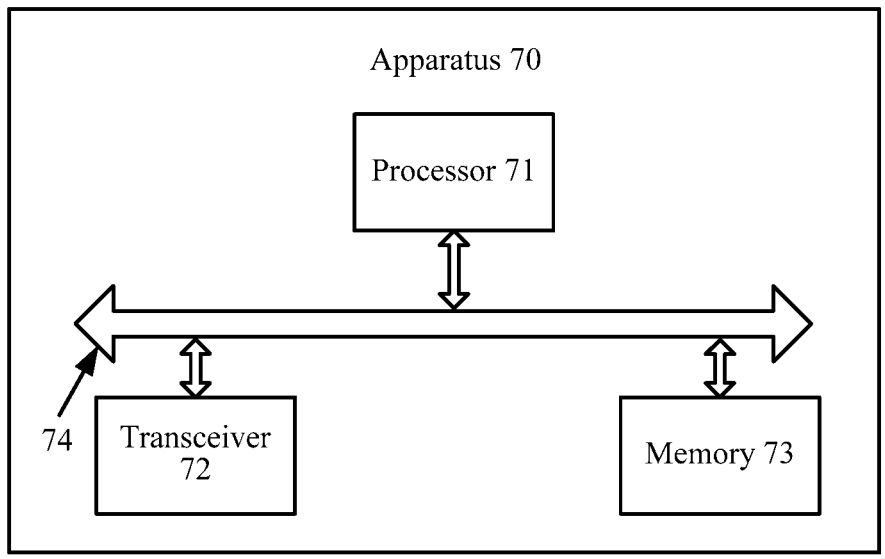
FIG. 17 is a schematic block diagram of an uplink data transmission apparatus according to still another embodiment of the present invention.

FIG. 17 shows an uplink data transmission apparatus according to still another embodiment of the present invention. As shown in FIG. 17, the apparatus 70 includes: a processor 71 and a transceiver 72. The processor 71 is connected to the transceiver 72. Optionally, the apparatus 70 further includes a memory 73. The memory 73 is connected to the processor 71. Optionally, the apparatus 70 further includes a bus system 74. The processor 71, the memory 73, and the transceiver 72 may be connected by using the bus system 74. The memory 73 may be configured to store an instruction. The processor 71 is configured to execute the instruction stored in the memory 73, to control the transceiver 72 to send information or a signal.

The transceiver 72 is configured to send a second message including indication information. The indication information is used to enable a terminal device to determine, according to the indication information, a contention transmission unit CTU for uplink data transmission. The uplink data transmission is transmitting uplink data by using at least two CTUs that are in a same time interval TTI. The CTU refers to a transmission resource combining a time, a frequency, and a code domain, or a transmission resource combining a time, a frequency, and a pilot, or a transmission resource combining a time, a frequency, a code domain, and a pilot. The uplink data transmitted by using the at least two CTUs is partially same or totally same.

Optionally, in an embodiment, the transceiver 72 is further configured to receive, before sending the second message including the indication information, a first message including transmission mode information. The transmission mode information is used to indicate that the terminal device is capable of transmitting uplink data by using at least two CTUs that are in a same TTI.

The uplink data transmission apparatus 70 according to this embodiment of the present invention may correspond to the network device in the method 700 in the embodiments of the present invention. In addition, the foregoing and other operations and/or functions of the units, that is, the modules in the apparatus 70 are respectively intended to implement corresponding procedures in the method 700. For brevity, details are not described herein again.

Alternatively, the transceiver 72 is configured to receive a second message including indication information. The indication information is used to enable the apparatus to determine, according to the indication information, a contention transmission unit CTU for uplink data transmission. The uplink data transmission is transmitting uplink data by using at least two CTUs that are in a same time interval TTI. The CTU refers to a transmission resource combining a time, a frequency, and a code domain, or a transmission resource combining a time, a frequency, and a pilot, or a transmission resource combining a time, a frequency, a code domain, and a pilot. The uplink data transmitted by using the at least two CTUs is partially same or totally same.

Optionally, in an embodiment, before receiving the second message including the indication information, the transceiver 72 is further configured to send a first message including transmission mode information. The transmission mode information is used to indicate that the apparatus is capable of transmitting uplink data by using at least two CTUs that are in a same TTI.

The uplink data transmission apparatus 70 according to this embodiment of the present invention may correspond to the terminal device in the method 700 in the embodiments of the present invention. In addition, the foregoing and other operations and/or functions of the units, that is, the modules in the apparatus 70 are respectively intended to implement corresponding procedures in the method 700. For brevity, details are not described herein again.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular characteristics, structures, or features may be combined in one or more embodiments in a random appropriate manner.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, the units and steps in the examples described with reference to the embodiments disclosed herein can be implemented by electronic hardware, computer software, or a combination thereof. To clearly describe the interchangeability between the hardware and the software, the foregoing has usually described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be indirect couplings or communication connections between apparatuses or units through some interfaces, and may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that may store program code, such as a USB flash drive, a removable hard disk, a read-only memory (Read-Only Memory, "ROM" for short), a random access memory (Random Access Memory, "RAM" for short), a magnetic disk, or an optical disc.

It may be understood that, for the brevity and clarity of the application document, technical features and description in an embodiment in the foregoing are applicable to other embodiments, for example, technical features in a method embodiment may be applicable to an apparatus embodiment or another method embodiment, and are no longer described in detail one by one in the other embodiments.

A sending module, a sending unit, or a transmitter in the foregoing embodiments may perform transmission on an air interface, or may not perform transmission on an air interface, but perform transmission to another device, so that another device performs transmission on the air interface. A receiving module, a receiving unit, or a receiver in the foregoing embodiments may perform reception on an air interface, or may not perform reception on an air interface, but perform reception from another device that performs reception from the air interface.

The foregoing descriptions are merely specific implementations of the present invention, but are not intended to limit the protection scope of the present invention. Any variation or replacement that may be readily figured out by a person skilled in the art within the technical scope disclosed in the present invention shall fall within the protection scope of the present invention. Therefore, the protection scope of the present invention shall be subject to the protection scope of the claims.

Further embodiments of the present invention are provided in the following. It should be noted that the numbering used in the following section does not necessarily need to comply with the numbering used in the previous sections. Each embodiment starts from a numbering. The numbering of following embodiments may not be consecutive.

1. An uplink data transmission method, wherein the method is performed by a network device, and the method comprises:

sending a second message comprising indication information, wherein the indication information is used to enable a terminal device to determine, according to the indication information, a contention transmission unit CTU for uplink data transmission, the uplink data transmission is transmitting uplink data by using at least two CTUs that are in a same transmission time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

2. The method according to embodiment 1, wherein before the sending a second message comprising indication information, the method further comprises:

receiving a first message comprising transmission mode information, wherein the transmission mode information is used to indicate that the terminal device is capable of transmitting uplink data by using at least two CTUs that are in a same TTI.

3. The method according to embodiment 1 or 2, wherein the indication information comprises at least one type of the following information:

information about a dedicated connection signature DCS of the terminal device;

information about a CTU;

information about a quantity of CTUs that can be used for the terminal device to transmit the uplink data;

information about a CTU access region;

information about a quantity of CTUs in a CTU access region;

information about a starting CTU in a CTU access region; or information about a CTU-sequence-number mapping rule.

4. The method according to embodiment 3, wherein the CTU access region is a CTU access region used for redundant transmission.

5. The method according to embodiment 3, wherein the information about the CTU-sequence-number mapping rule is a rule for determining a CTU sequence number according to any one or more of the following parameters:

the information about the DCS of the terminal device;

the quantity of CTUs that can be used for the terminal device to transmit the uplink data;

the quantity of CTUs in the CTU access region; or a sequence number of the starting CTU in the CTU access region.

6. The method according to embodiment 4, wherein the information about the CTU-sequence-number mapping rule is a rule for determining a CTU sequence number according to any one or more of the following parameters:

the information about the DCS of the terminal device;

a quantity of CTUs that can be used for the terminal device to redundantly transmit the uplink data;

a quantity of CTUs in the CTU access region used for redundant transmission; or a sequence number of a starting CTU in the CTU access region used for redundant transmission.

7. The method according to embodiment 5, wherein the rule for determining the CTU sequence number is any one or more of the following formulas:

$$I_{CTU\text{-}ij}=(I_{CTU\text{-}INT}+DCS_i+j) \bmod N_{CTU}, \text{ or}$$

$$I_{CTU\text{-}ij}=f(I_{CTU\text{-}INT}+DCS_i+j) \bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{CTU}$ is the quantity of CTUs in the CTU access region.

8. The method according to embodiment 6, wherein the rule for determining the CTU sequence number is any one or more of the following formulas:

$$I_{CTU\text{-}ij}=(I_{CTU\text{-}INT}+DCS_i+j) \bmod N_{CTU}, \text{ or}$$

$$I_{CTU\text{-}ij}=f(I_{CTU\text{-}INT}+DCS_i+j) \bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{CTU}$ is the quantity of CTUs in the CTU access region used for redundant transmission.

9. The method according to any one of embodiments 3 to 8, wherein the CTU access region comprises one or multiple CTU access regions, wherein the multiple CTU access regions are CTU access regions belonging to a same TTI.

10. The method according to embodiment 9, wherein the multiple CTU access regions further comprise CTU access regions belonging to different TTIs.

11. The method according to any one of embodiments 1 to 10, wherein the uplink data transmitted by using the at least two CTUs is data to be retransmitted.

12. The method according to any one of embodiments 1 to 11, wherein the uplink data transmission is grant free transmission.

13. The method according to any one of embodiments 1 to 12, wherein the method is applicable to any one or more of the following fields: a device to device D2D field, a machine to machine M2M field, or a machine type communication MTC field.

14. An uplink data transmission method, wherein the method is performed by a terminal device, and the method comprises:

receiving a second message comprising indication information, wherein the indication information is used to enable the terminal device to determine, according to the indication information, a contention transmission unit CTU for uplink data transmission, the uplink data transmission is transmitting uplink data by using at least two CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

15. The method according to embodiment 14, wherein before the receiving a second message comprising indication information, the method further comprises:

sending a first message comprising transmission mode information, wherein the transmission mode information is used to indicate that the terminal device is capable of transmitting uplink data by using at least two CTUs that are in a same TTI.

16. The method according to embodiment 14 or 15, wherein the indication information comprises at least one type of the following information:

information about a dedicated connection signature DCS of the terminal device;

information about a CTU;

information about a quantity of CTUs that can be used for the terminal device to transmit the uplink data;

information about a CTU access region;

information about a quantity of CTUs in a CTU access region;

information about a starting CTU in a CTU access region; or information about a CTU-sequence-number mapping rule.

17. The method according to embodiment 16, wherein the CTU access region is a CTU access region used for redundant transmission.

18. The method according to embodiment 16, wherein the information about the CTU-sequence-number mapping rule is a rule for determining a CTU sequence number according to any one or more of the following parameters:

the information about the DCS of the terminal device;

the quantity of CTUs that can be used for the terminal device to transmit the uplink data;

the quantity of CTUs in the CTU access region; or a sequence number of the starting CTU in the CTU access region.

19. The method according to embodiment 17, wherein the information about the CTU-sequence-number mapping rule is a rule for determining a CTU sequence number according to any one or more of the following parameters:

the information about the DCS of the terminal device;

a quantity of CTUs that can be used for the terminal device to redundantly transmit the uplink data;

a quantity of CTUs in the CTU access region used for redundant transmission; or a sequence number of a starting CTU in the CTU access region used for redundant transmission.

20. The method according to embodiment 18, wherein the rule for determining the CTU sequence number is any one or more of the following formulas:

$$I_{CTU\text{-}ij}=(I_{CTU\text{-}INT}+DCS_i+j)\bmod N_{CTU}, \text{ or}$$

$$I_{CTU\text{-}ij}=f(I_{CTU\text{-}INT}+DCS_i+j)\bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{CTU}$ is the quantity of CTUs in the CTU access region.

21. The method according to embodiment 19, wherein the rule for determining the CTU sequence number is any one or more of the following formulas:

$$I_{CTU\text{-}ij}=(I_{CTU\text{-}INT}+DCS_i+j)\bmod N_{CTU}, \text{ or}$$

$$I_{CTU\text{-}ij}=f(I_{CTU\text{-}INT}+DCS_i+j)\bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{CTU}$ is the quantity of CTUs in the CTU access region used for redundant transmission.

22. The method according to any one of embodiments 16 to 21, wherein the CTU access region comprises one or multiple CTU access regions, wherein the multiple CTU access regions are CTU access regions belonging to a same TTI.

23. The method according to embodiment 22, wherein the multiple CTU access regions further comprise CTU access regions belonging to different TTIs.

24. The method according to any one of embodiments 14 to 23, wherein the uplink data transmitted by using the at least two CTUs is data to be retransmitted.

25. The method according to any one of embodiments 14 to 24, wherein the uplink data transmission is grant free transmission.

26. The method according to any one of embodiments 14 to 25, wherein the method is applicable to any one or more of the following fields: a device to device D2D field, a machine to machine M2M field, or a machine type communication MTC field.

27. An uplink data transmission apparatus, comprising:

a sending module, configured to send a second message comprising indication information, wherein the indication information is used to enable a terminal device to determine, according to the indication information, a contention transmission unit CTU for uplink data transmission, the uplink data transmission is transmitting uplink data by using at least two CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

28. The apparatus according to embodiment 27, wherein the apparatus further comprises a receiving module, and before the sending module sends the second message comprising the indication information, the receiving module is configured to:

receive a first message comprising transmission mode information, wherein the transmission mode information is used to indicate that the terminal device is capable of transmitting uplink data by using at least two CTUs that are in a same TTI.

29. The apparatus according to embodiment 27 or 28, wherein the indication information comprises at least one type of the following information:

information about a dedicated connection signature DCS of the terminal device;

information about a CTU;

information about a quantity of CTUs that can be used for the terminal device to transmit the uplink data;

information about a CTU access region;

information about a quantity of CTUs in a CTU access region;

information about a starting CTU in a CTU access region; or information about a CTU-sequence-number mapping rule.

30. The apparatus according to embodiment 29, wherein the CTU access region is a CTU access region used for redundant transmission.

31. The apparatus according to embodiment 29, wherein the information about the CTU-sequence-number mapping rule is a rule for determining a CTU sequence number according to any one or more of the following parameters:

the information about the DCS of the terminal device;

the quantity of CTUs that can be used for the terminal device to transmit the uplink data;

the quantity of CTUs in the CTU access region; or a sequence number of the starting CTU in the CTU access region.

32. The apparatus according to embodiment 30, wherein the information about the CTU-sequence-number mapping rule is a rule for determining a CTU sequence number according to any one or more of the following parameters:

the information about the DCS of the terminal device;

a quantity of CTUs that can be used for the terminal device to redundantly transmit the uplink data;

a quantity of CTUs in the CTU access region used for redundant transmission; or a sequence number of a starting CTU in the CTU access region used for redundant transmission.

33. The apparatus according to embodiment 31, wherein the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of a terminal device $UE_i$, $\Delta_i$ is a quantity of CTUs that can be used for $UE_i$ to transmit uplink data, and $N_{CTU}$ is the quantity of CTUs in the CTU access region.

34. The apparatus according to embodiment 32, wherein the rule for determining the CTU sequence number is any one or more of the following formulas:

$$I_{CTU\text{-}ij} = (I_{CTU\text{-}INT} + DCS_i + j) \bmod N_{CTU}, \text{ or}$$

$$I_{CTU\text{-}ij} = f(I_{CTU\text{-}INT} + DCS_i + j) \bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of a terminal device $UE_i$, $\Delta_i$ is a quantity of CTUs that can be used for $UE_i$ to redundantly transmit uplink data, and $N_{CTU}$ is the quantity of CTUs in the CTU access region used for redundant transmission.

35. The apparatus according to any one of embodiments 29 to 34, wherein the CTU access region comprises one or multiple CTU access regions, wherein the multiple CTU access regions are CTU access regions belonging to a same TTI.

36. The apparatus according to embodiment 35, wherein the multiple CTU access regions further comprise CTU access regions belonging to different TTIs.

37. The apparatus according to any one of embodiments 27 to 36, wherein the uplink data transmitted by using the at least two CTUs is data to be retransmitted.

38. The apparatus according to any one of embodiments 27 to 37, wherein the uplink data transmission is grant free transmission.

39. The apparatus according to any one of embodiments 27 to 38, wherein the apparatus is applicable to any one or more of the following fields: a device to device D2D field, a machine to machine M2M field, or a machine type communication MTC field.

40. The apparatus according to any one of embodiments 27 to 39, wherein the apparatus is a network device.

41. An uplink data transmission apparatus, comprising:

a receiving module, configured to receive a second message comprising indication information, wherein the indication information is used to enable the apparatus to determine, according to the indication information, a contention transmission unit CTU for uplink data transmission, the uplink data transmission is transmitting uplink data by using at least two CTUs that are in a same time interval TTI, the CTU refers to a transmission resource combining a time, a frequency, and a code domain, or a transmission resource combining a time, a frequency, and a pilot, or a transmission resource combining a time, a frequency, a code domain, and a pilot, and the uplink data transmitted by using the at least two CTUs is partially same or totally same.

42. The apparatus according to embodiment 41, wherein the apparatus further comprises a sending module, and before the receiving module receives the second message comprising the indication information, the sending module is configured to:

send a first message comprising transmission mode information, wherein the transmission mode information is used to indicate that the apparatus is capable of transmitting uplink data by using at least two CTUs that are in a same TTI.

43. The apparatus according to embodiment 41 or 42, wherein the indication information comprises at least one type of the following information:

information about a dedicated connection signature DCS of the apparatus;

information about a CTU;

information about a quantity of CTUs that can be used for the apparatus to transmit the uplink data;

information about a CTU access region;

information about a quantity of CTUs in a CTU access region;

information about a starting CTU in a CTU access region; or information about a CTU-sequence-number mapping rule.

44. The apparatus according to embodiment 43, wherein the CTU access region is a CTU access region used for redundant transmission.

45. The apparatus according to embodiment 43, wherein the information about the CTU-sequence-number mapping rule is a rule for determining a CTU sequence number according to any one or more of the following parameters:
the information about the DCS of the apparatus;
the quantity of CTUs that can be used for the apparatus to transmit the uplink data;
the quantity of CTUs in the CTU access region; or
a sequence number of the starting CTU in the CTU access region.

46. The apparatus according to embodiment 44, wherein the information about the CTU-sequence-number mapping rule is a rule for determining a CTU sequence number according to any one or more of the following parameters:
the information about the DCS of the apparatus;
a quantity of CTUs that can be used for the apparatus to redundantly transmit the uplink data;
a quantity of CTUs in the CTU access region used for redundant transmission; or
a sequence number of a starting CTU in the CTU access region used for redundant transmission.

47. The apparatus according to embodiment 45, wherein the rule for determining the CTU sequence number is any one or more of the following formulas:

$$I_{CTU\text{-}ij}=(I_{CTU\text{-}INT}+DCS_i+j)\bmod N_{CTU}, \text{ or}$$

$$I_{CTU\text{-}ij}=f(I_{CTU\text{-}INT}+DCS_i+j)\bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region, $DCS_i$ is a DCS of an apparatus $UE_i$, $\Delta_i$ is a quantity of CTUs that can be used for $UE_i$ to transmit uplink data, and $N_{CTU}$ is the quantity of CTUs in the CTU access region.

48. The apparatus according to embodiment 46, wherein the rule for determining the CTU sequence number is any one or more of the following formulas:

$$I_{CTU\text{-}ij}=(I_{CTU\text{-}INT}+DCS_i+j)\bmod N_{CTU}, \text{ or}$$

$$I_{CTU\text{-}ij}=f(I_{CTU\text{-}INT}+DCS_i+j)\bmod N_{CTU},$$

wherein $j=0, 1, \ldots, \Delta_i-1$, $DCS_1=0$, $DCS_i=DCS_{i-1}+\Delta_{i-1}$, $i=2, 3, \ldots$, $f(\cdot)$ is an interleaving function, an interleaving range is $[0, \ldots, N_{CTU}-1]$, $I_{CTU\text{-}ij}$ is a CTU sequence number, $I_{CTU\text{-}INT}$ is the sequence number of the starting CTU in the CTU access region used for redundant transmission, $DCS_i$ is a DCS of an apparatus $UE_i$, $\Delta_i$ is a quantity of CTUs that can be used for $UE_i$ to redundantly transmit uplink data, and $N_{CTU}$ is the quantity of CTUs in the CTU access region used for redundant transmission.

49. The apparatus according to any one of embodiments 43 to 48, wherein the CTU access region comprises one or multiple CTU access regions, wherein the multiple CTU access regions are CTU access regions belonging to a same TTI.

50. The apparatus according to embodiment 49, wherein the multiple CTU access regions further comprise CTU access regions belonging to different TTIs.

51. The apparatus according to any one of embodiments 42 to 50, wherein the uplink data transmitted by using the at least two CTUs is data to be retransmitted.

52. The apparatus according to any one of embodiments 42 to 51, wherein the uplink data transmission is grant free transmission.

53. The apparatus according to any one of embodiments 42 to 52, wherein the apparatus is applicable to any one or more of the following fields: a device to device D2D field, a machine to machine M2M field, or a machine type communication MTC field.

54. The apparatus according to any one of embodiments 42 to 53, wherein the apparatus is a terminal device.

What is claimed is:

1. A method for performing, by a terminal device, an uplink data transmission within at least two contention transmission units (CTUs) of a same transmission time interval (TTI), the method comprising:
sending a first message to a network device, where the first message indicates a capability of the terminal device to transmit uplink data using multiple CTUs in a same TTI;
receiving a second message issued by the network device, wherein the second message comprises indication information enabling the terminal device to determine, according to the indication information, the at least two CTUs of the same TTI for the uplink data transmission; and
determining the at least two CTUs of the same TTI in response to the receiving the second message; and
transmitting, after the determining, an uplink data using the at least two CTUs,
wherein each of the at least two CTUs are a transmission resource defined by a combination of transmission resource defining values taken from the group of parameter combinations consisting of:
a time, a frequency, and a code domain,
a time, a frequency, and a pilot; and
a time, a frequency, a code domain, and a pilot; and
wherein the uplink data transmitted by using the at least two CTUs is:
partially same, in which case different data of the uplink data transmission by the terminal device is transmitted by each one of the multiple CTUs within the same TTI, or
totally same, in which case same data of the uplink data transmission by the terminal device is transmitted by each one of the multiple CTUs within the same TTI.

2. The method according to claim 1, wherein the first message comprises a transmission mode information indicating that the terminal device is capable of transmitting uplink data using at least two CTUs within a same TTI.

3. The method according to claim 1, wherein the indication information comprises at least one type of information taken from the group consisting of:
information about a dedicated connection signature (DCS) of the terminal device;
information about a CTU;
information about a quantity of CTUs that can be used for the terminal device to transmit the uplink data;
information about a CTU access region;
information about a quantity of CTUs in a CTU access region;
information about a starting CTU in a CTU access region; and
information about a CTU-sequence-number mapping rule.

4. The method according to claim 3, wherein the CTU access region is a CTU access region used for redundant transmission.

5. The method according to claim 3, wherein the CTU access region comprises one or multiple CTU access regions, and wherein the multiple CTU access regions are CTU access regions belonging to a same TTI.

6. The method according to claim 5, wherein the multiple CTU access regions further comprise CTU access regions belonging to different TTIs.

7. The method according to claim 1, wherein the uplink data transmission comprises data to be retransmitted.

8. A network device, comprising:
a processor; and
a non-transitory computer-readable medium including computer-executable instructions that, when executed by the processor, facilitate carrying out a method for configuring a terminal device to perform an uplink data transmission within at least two contention transmission units (CTUs) of a same transmission time interval (TTI), the method comprising:
  receiving a first message from the terminal device, where the first message indicates a capability of the terminal device to transmit uplink data using multiple CTUs in a same TTI;
  sending a second message to the terminal device, wherein the second message comprises indication information enabling the terminal device to determine, according to the indication information, the at least two CTUs of the same TTI for the uplink data transmission;
  wherein the second message is used by the terminal device to:
    determine the at least two CTUs of the same TTI in response to the receiving the second message; and
    transmit, after determining the at least two CTUs, an uplink data using the at least two CTUs,
  wherein each of the at least two CTUs are a transmission resource defined by a combination of transmission resource defining values taken from the group of parameter combinations consisting of:
    a time, a frequency, and a code domain,
    a time, a frequency, and a pilot; and
    a time, a frequency, a code domain, and a pilot; and
  wherein the uplink data transmitted by using the at least two CTUs is:
    partially same, in which case different data of the uplink data transmission by the terminal device is transmitted by each one of the multiple CTUs within the same TTI, or
    totally same, in which case same data of the uplink data transmission by the terminal device is transmitted by each one of the multiple CTUs within the same TTI.

9. The network device according to claim 8, wherein the first message comprises a transmission mode information indicating that the terminal device is capable of transmitting uplink data using at least two CTUs within a same TTI.

10. The network device according to claim 8, wherein the indication information comprises at least one type of information taken from the group consisting of:
  information about a dedicated connection signature (DCS) of the terminal device;
  information about a CTU;
  information about a quantity of CTUs that can be used for the terminal device to transmit the uplink data;
  information about a CTU access region;
  information about a quantity of CTUs in a CTU access region;
  information about a starting CTU in a CTU access region; and
  information about a CTU-sequence-number mapping rule.

11. The network device according to claim 10, wherein the CTU access region is a CTU access region used for redundant transmission.

12. The network device according to claim 10, wherein the CTU access region comprises one or multiple CTU access regions, and wherein the multiple CTU access regions are CTU access regions belonging to a same TTI.

13. A terminal device, comprising:
a processor; and
a non-transitory computer-readable medium including computer-executable instructions that, when executed by the processor, facilitate carrying out a method for performing, by the terminal device, an uplink data transmission within at least two contention transmission units (CTUs) of a same transmission time interval (TTI), the method comprising:
  sending a first message to a network device, where the first message indicates a capability of the terminal device to transmit uplink data using multiple CTUs in a same TTI;
  receiving a second message issued by the network device, wherein the second message comprises indication information enabling the terminal device to determine, according to the indication information, the at least two CTUs of the same TTI for the uplink data transmission; and
  determining the at least two CTUs of the same TTI in response to the receiving the second message; and
  transmitting, after the determining, an uplink data using the at least two CTUs,
  wherein each of the at least two CTUs are a transmission resource defined by a combination of transmission resource defining values taken from the group of parameter combinations consisting of:
    a time, a frequency, and a code domain,
    a time, a frequency, and a pilot; and
    a time, a frequency, a code domain, and a pilot; and
  wherein the uplink data transmitted by using the at least two CTUs is:
    partially same, in which case different data of the uplink data transmission by the terminal device is transmitted by each one of the multiple CTUs within the same TTI, or
    totally same, in which case same data of the uplink data transmission by the terminal device is transmitted by each one of the multiple CTUs within the same TTI.

14. The terminal device according to claim 13, wherein the first message comprises a transmission mode information indicating that the terminal device is capable of transmitting uplink data using at least two CTUs within a same TTI.

15. The terminal device according to claim 13, wherein the indication information comprises at least one type of information taken from the group consisting of:
  information about a dedicated connection signature (DCS) of the apparatus;
  information about a CTU;
  information about a quantity of CTUs that can be used for the apparatus to transmit the uplink data;
  information about a CTU access region;
  information about a quantity of CTUs in a CTU access region;
  information about a starting CTU in a CTU access region; or information about a CTU-sequence-number mapping rule.

16. The terminal device according to claim 15, wherein the CTU access region is a CTU access region used for redundant transmission.

17. The terminal device according to claim 15, wherein the CTU access region comprises one or multiple CTU access regions, wherein the multiple CTU access regions are CTU access regions belonging to a same TTI.

18. The terminal device according to claim 17, wherein the multiple CTU access regions further comprise CTU access regions belonging to different TTIs.

19. The terminal device according to claim 13, wherein the uplink data transmission comprises data to be retransmitted.

20. The terminal device according to claim 13, wherein the uplink data transmission is a grant free transmission.

* * * * *